(12) United States Patent
Robinson

(10) Patent No.: US 11,246,295 B2
(45) Date of Patent: Feb. 15, 2022

(54) ANIMAL RESTRAINT

(71) Applicant: Lennie D. Robinson, Brooklyn Park, MN (US)

(72) Inventor: Lennie D. Robinson, Brooklyn Park, MN (US)

(*) Notice: Subject to any disclaimer, the term of this patent is extended or adjusted under 35 U.S.C. 154(b) by 202 days.

(21) Appl. No.: 16/576,975

(22) Filed: Sep. 20, 2019

(65) Prior Publication Data
US 2020/0093097 A1  Mar. 26, 2020

Related U.S. Application Data

(60) Provisional application No. 62/734,341, filed on Sep. 21, 2018.

(51) Int. Cl.
*A01K 27/00* (2006.01)
*A01K 15/02* (2006.01)

(52) U.S. Cl.
CPC ............ *A01K 27/001* (2013.01); *A01K 15/02* (2013.01)

(58) Field of Classification Search
CPC ...... A01K 27/001; A01K 15/02; A01K 27/00; A01K 27/002; A01K 27/003; B68B 3/04; B68B 3/06; B68B 3/08
See application file for complete search history.

(56) References Cited

U.S. PATENT DOCUMENTS

| X226510 | 4/1880 | Foulke |
| X274229 | 3/1883 | Snyder |
| X277463 | 5/1883 | Cosbie |
| X286010 | 10/1883 | Humber |
| X305179 | 9/1884 | Hagerty |
| X308881 | 12/1884 | Degnan et al. |
| X313715 | 3/1885 | Evans |
| X313775 | 3/1885 | Scantlebury |
| X323274 | 7/1885 | Cavanagh |
| X323436 | 8/1885 | McDevitt |

(Continued)

FOREIGN PATENT DOCUMENTS

| CN | 101543188 A | 9/2009 |
| CN | 105052772 A | 11/2015 |

(Continued)

OTHER PUBLICATIONS

Whiskers N Paws "Tru-fit smart harness." URL: https://www.wnp.com.hk/products/tru-fit-smart-haress-size-small. Accessed Apr. 17, 2018.

(Continued)

*Primary Examiner* — Trinh T Nguyen
(74) *Attorney, Agent, or Firm* — Merchant & Gould P.C.

(57) ABSTRACT

An animal restraint is disclosed for mitigating collar trauma to critical neck structures of an animal. The animal restraint includes a track housing defining an exterior surface and an interior surface. A plurality of loops are positioned on the exterior surface of the track housing. A strap is threaded through the loops, and is adapted to slide around the exterior surface of the track housing from a pulling force on the animal restraint. The strap includes a leash attachment ring adapted for attachment to a leash. Impact resistant padding is attached to the interior surface of the track housing, and the sliding movement of the strap maintains a proper positioning of the impact resistant padding over corresponding anatomical neck structures of an animal.

14 Claims, 26 Drawing Sheets

(56) References Cited

U.S. PATENT DOCUMENTS

| | | |
|---|---|---|
| X367950 | 8/1887 | Boleska |
| X417369 | 12/1889 | Schott |
| X468669 | 2/1892 | Lukens |
| X591758 | 10/1897 | Hainsworth |
| X856649 | 6/1907 | Mott |
| 1,110,338 A | 9/1914 | Nelson |
| 1,207,059 A | 12/1916 | McClure |
| 3,687,112 A | 8/1972 | Henderson |
| 4,345,548 A | 8/1982 | Krebs et al. |
| 6,606,967 B1 | 8/2003 | Wolfe, Jr. et al. |
| 6,830,014 B1 | 12/2004 | Lalor |
| 2006/0081197 A1 | 4/2006 | Kuykendall |

FOREIGN PATENT DOCUMENTS

| | | |
|---|---|---|
| CN | 207639425 U | 7/2018 |
| JP | 3158271 U | 3/2010 |

OTHER PUBLICATIONS

GistGear. "Highest rated dog pinch collars." URL: http://gistgear.com/home/pet-supplies/dog-pinch-collars. Accessed Apr. 17, 2018.
International Search Report and Written Opinion for Application No. PCT/US2019/052184 dated Jan. 10, 2020.

ANIMAL RESTRAINT

CROSS-REFERENCE TO RELATED APPLICATIONS

The present application claims priority to U.S. Provisional Patent Application No. 62/734,341 filed Sep. 21, 2018, the disclosure of which is hereby incorporated by reference in its entirety.

BACKGROUND

Several types of animal restraints exist, some of which include collars and harnesses. Restraints are used for many purposes, and are sometimes even required by law to be used when pet animals such as dogs are in public places.

Animal restraints, such as collars and harnesses, are commonly used when a human owner walks a dog. A leash, cable, tether, or chain that can be held by the human owner is typically connected to the restraint. The restraint allows the human owner to maintain control over the dog such as to prevent the dog from running away, to prevent the dog from engaging other animals, or to prevent injury to the dog from running into a moving object such as a vehicle moving in traffic.

Additionally, most municipalities have laws restricting free roaming of dogs. Therefore, in addition to walking an animal on a leash, it is common practice to tether the animal to a stationary object, such as a house or yard stake. In such scenarios, the restraint can be attached to a leash or chain, and the leash or chain can then be attached to a stationary object in order to constrain the animal to a designated area.

Many animal restraints include a strap that goes around, or partially around, the animal's neck. Because of this, the restraint has the potential to harm important anatomical structures in the neck. For example, when a dog pulls against the restraint, the force is transferred through the strap along the neck and into the tracheal region of the dog's throat. Even a mild leash pull is enough force to cause harm or trauma to the dog. Such harm can include irreversible damage to the delicate structures in the neck including, but not limited to, tracheal collapse, thyroid glandular damage, glaucoma, and/or cervical spine trauma.

Also, most animal restraints include a fastening point such as a ring or loop for connecting a leash. Several problems are caused by the fact that the fastening point is connected to the restraint at a fixed location. For example, if the dog pulls on the leash, the force tends to make the restraint rotate around the dog's neck or body. Also, most dogs, unless well trained, will naturally pull against a leash when the animal feels resistance from the leash. Therefore, when the dog pulls on the leash, it can cause the dog to lean unnaturally to counteract the resistance from the leash in order to maintain balance. Over time this unnatural gait can cause injury such as arthritis, and overuse syndromes or inflammation of joint capsules, tendons, ligaments, and/or muscles.

Therefore, improvements are needed to improve the safety of animal restraints to minimize and/or prevent collar trauma to critical neck structures of an animal as well as to prevent an unbalanced or misaligned gait.

SUMMARY

The present disclosure relates generally to an animal restraint for mitigating collar trauma to critical neck structures of an animal. In one possible configuration and by non-limiting example, the animal restraint includes a strap adapted to slide around an exterior surface of a track housing, the sliding movement of the strap maintaining a proper positioning of an impact resistant padding over corresponding anatomical neck structures of the animal when a pulling force is applied by the animal to the animal restraint.

In one aspect, the present disclosure relates to an animal restraint for mitigating collar trauma to critical neck structures of an animal, the animal restraint comprising: a track housing defining an exterior surface and an interior surface; a plurality of loops positioned on the exterior surface of the track housing; a strap threaded through the loops, the strap adapted to slide around the exterior surface of the track housing from a pulling force on the animal restraint, the strap including a leash attachment ring adapted for attachment to a leash; and impact resistant padding attached to the interior surface of the track housing, the sliding movement of the strap maintaining a proper positioning of the impact resistant padding over corresponding anatomical neck structures of an animal.

In another aspect, the present disclosure relates to an impact resistant padding for an animal restraint, the impact resistant padding comprising: an internal grid pattern that defines a plurality of empty cells, the internal grid pattern providing column buckling to disperse a pulling force on the animal restraint.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
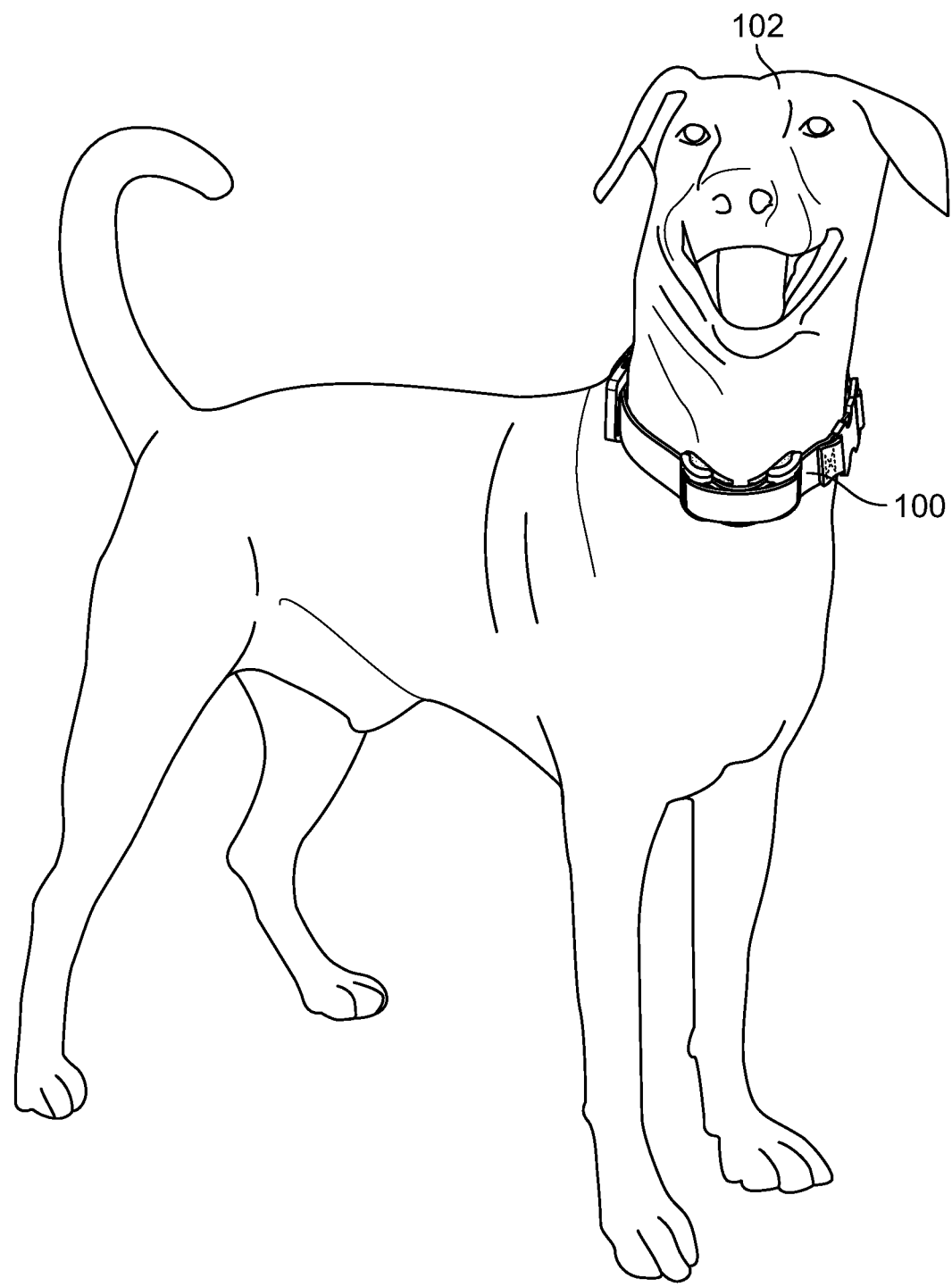
FIG. 1 is an isometric view of an animal restraint around the neck of an animal, in accordance with a first embodiment of the present disclosure.

Various embodiments of the present invention will be described in detail with reference to the drawings, wherein like reference numerals represent like parts and assemblies throughout the views. Reference to various embodiments does not limit the scope of the invention, which is limited only by the scope of the claims attached hereto. Any examples set forth in this specification are not intended to be limiting and merely set forth some of the many possible embodiments for the claimed invention.

FIG. 1 is an isometric view of an animal restraint 100 around the neck of an animal 102, in accordance with a first embodiment of the present disclosure. In the example embodiment depicted in FIG. 1, the animal restraint 100 is a collar. The animal restraint 100 can mitigate collar trauma to critical neck structures of the animal 102. Although the animal 102 in FIG. 1 is depicted as a dog, it is contemplated that the animal restraint 100 can be used to restrain various types of pet animals.

Figure 2:
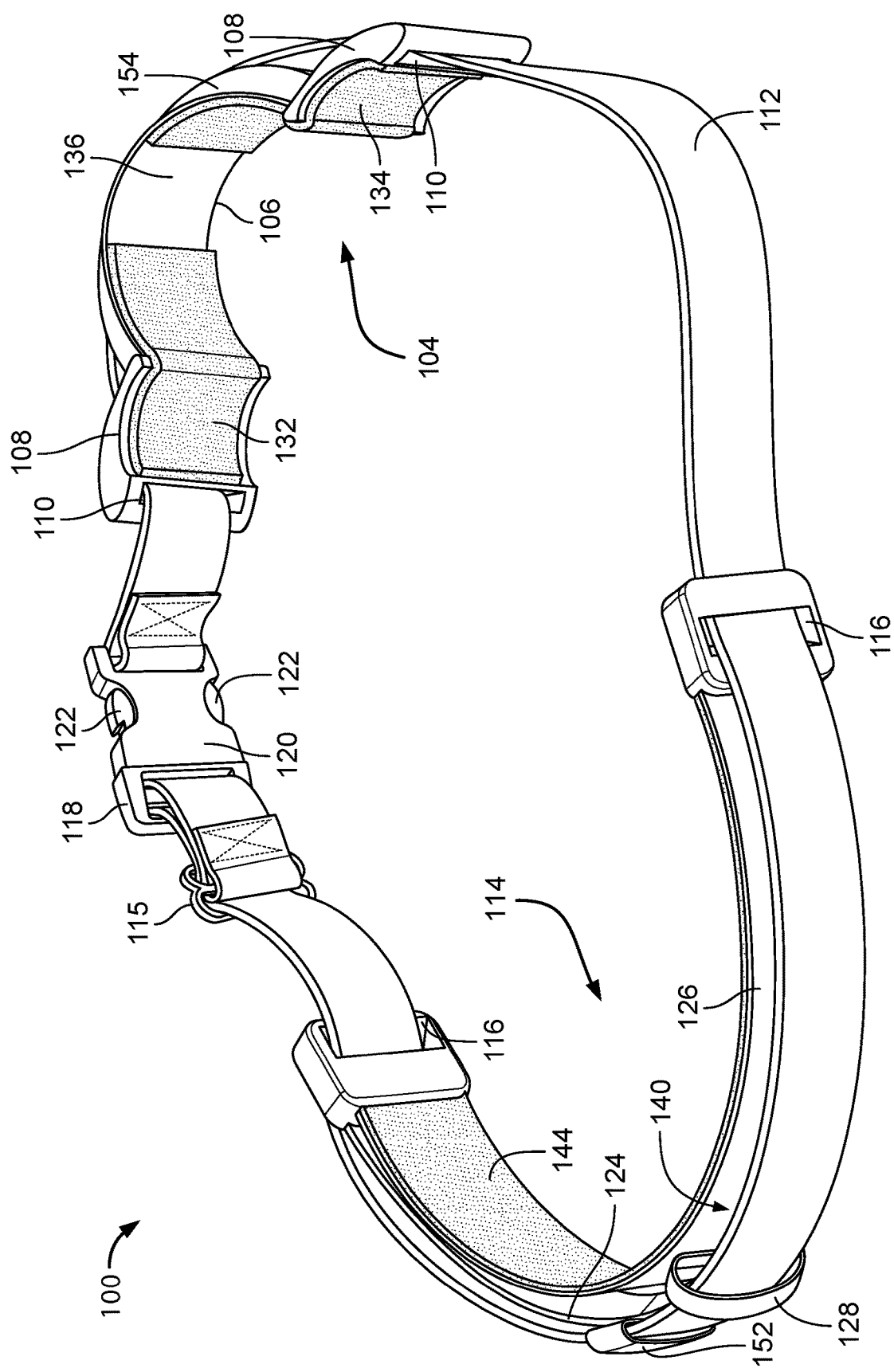
FIG. 2 is an isometric, assembled view of the animal restraint of FIG. 1.
Figure 3:
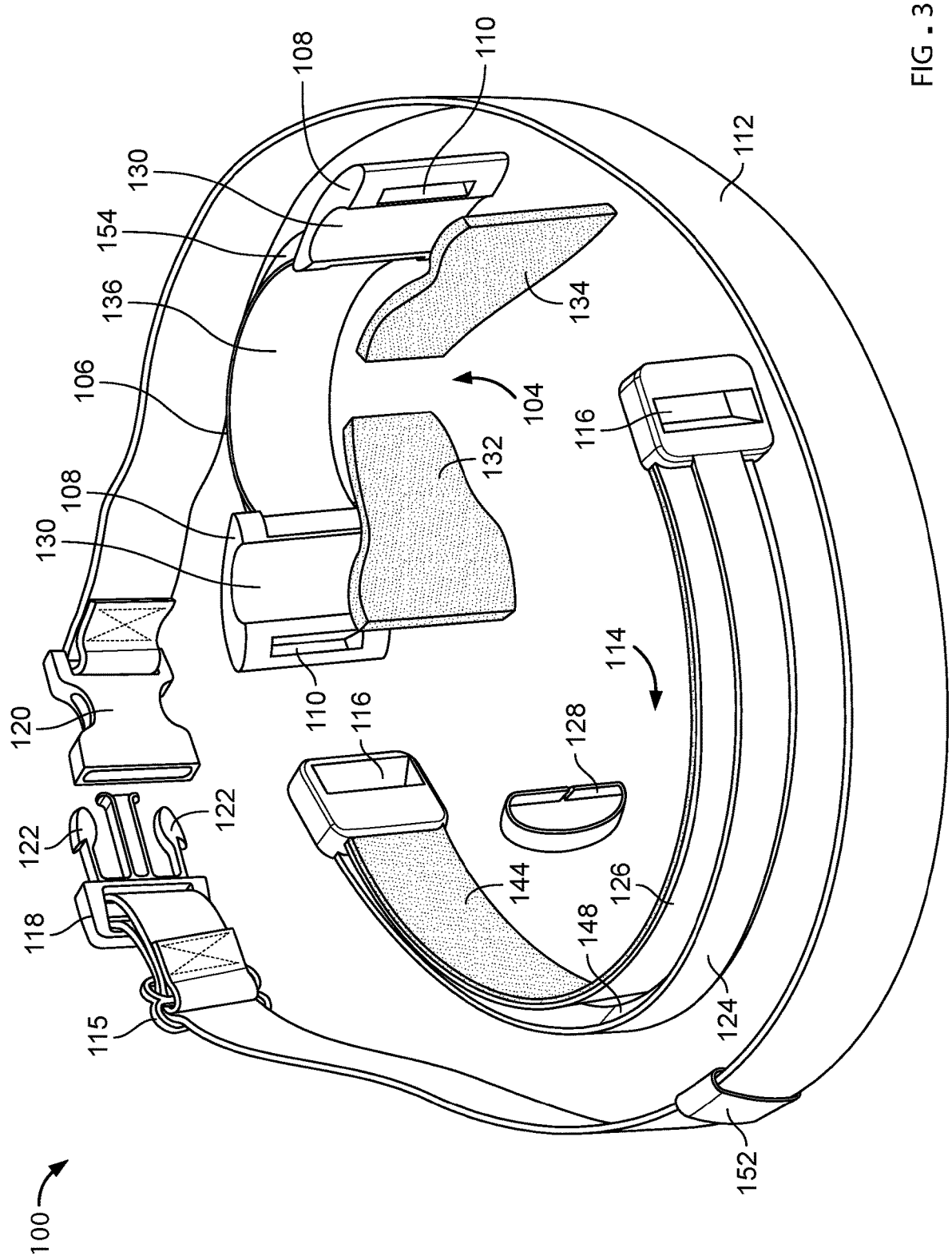
FIG. 3 is an isometric, dissembled view of the animal restraint of FIG. 1.

FIGS. 2 and 3 are assembled and disassembled isometric views, respectively, of the animal restraint 100 removed from the animal. As shown in FIGS. 2 and 3, the animal restraint 100 includes a tracheal cup 104. The tracheal cup 104 includes a tracheal guard 106, and thyroid guards 108 extending from opposite ends of the tracheal guard 106. Each thyroid guard 108 includes a slot 110 that receives a strap 112. In some examples, the slots 110 are angled grooves relative to the thyroid guards 108 so that the circumference of the strap 112 can be adjusted yet the strap 112 can also be maintained in a stationary position when the animal restraint 100 is worn.

The tracheal guard 106 and thyroid guards 108 of the tracheal cup 104 can be made from materials such that the animal restraint has flex yet also has sufficient rigidity and memory to maintain the contour or shape of the neck. At least some of the properties of the material used for making the tracheal guard 106 and thyroid guards 108 of the tracheal cup 104 can include flexibility, strength, and durability, as well as chemical, heat, and cold resistance. Accordingly, the tracheal guard 106 and the thyroid guards 108 can have flexibility and memory to shock absorb forces applied to the animal restraint 100 (e.g., when the animal restraint 100 is pulled by a leash), thereby reducing trauma to underlying anatomical structures of the animal. In some examples, the tracheal guard 106 and the thyroid guards 108 are made from a durable and flexible material, such as a thermoplastic polyester elastomer, including, for example, Dupont Hytrel® material, or other similar types of material.

Figure 4:
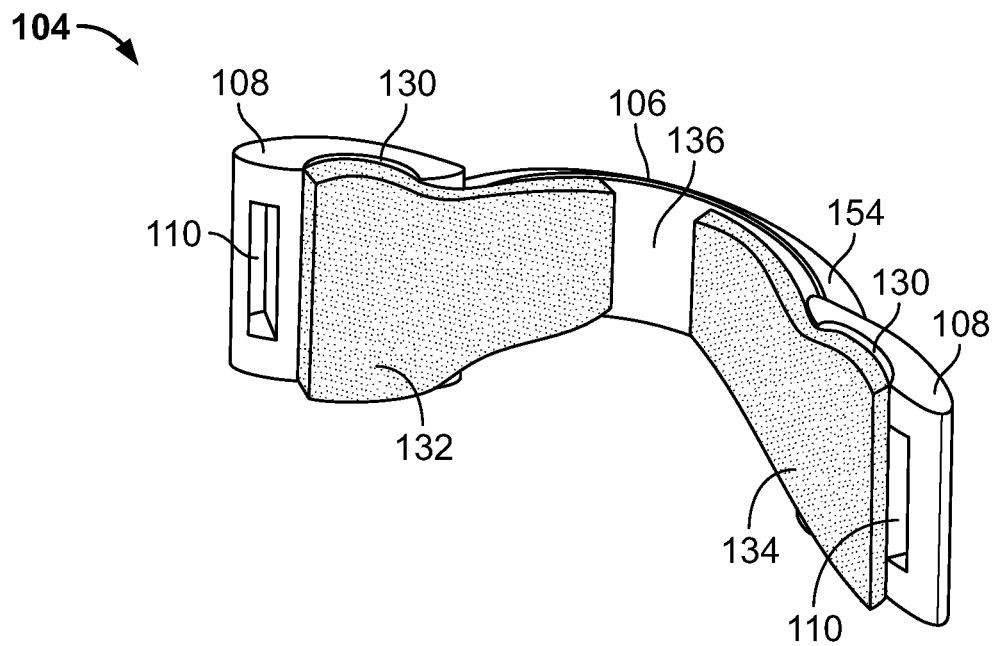
FIG. 4 is a rear isometric view of a tracheal cup according to the embodiment of the animal restraint of FIG. 1.
Figure 5:
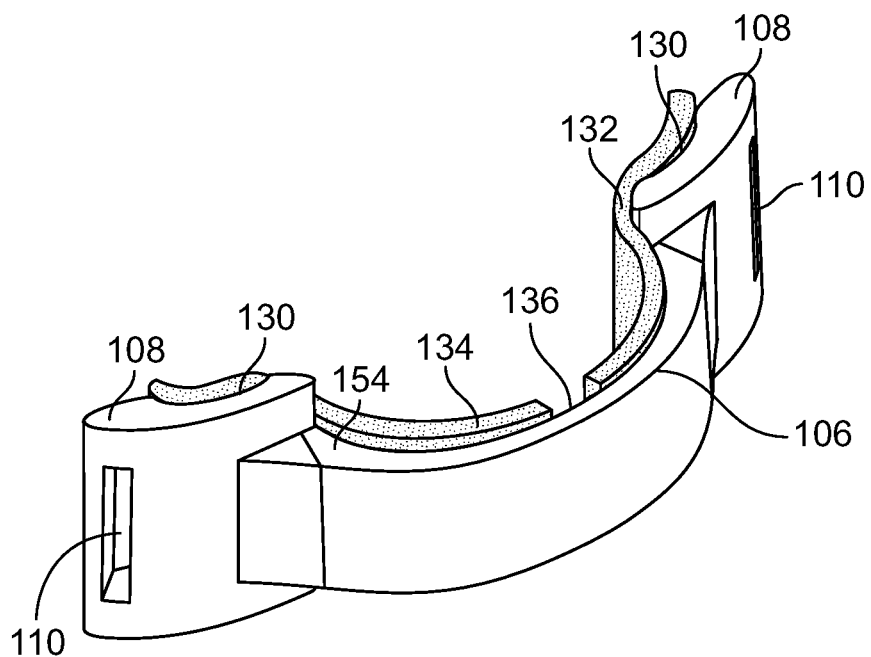
FIG. 5 is a front isometric view of the tracheal cup of FIG. 4.

FIGS. 4 and 5 are rear and front isometric views, respectively of the tracheal cup 104. As shown in FIGS. 2-5, the tracheal cup 104 has impact-resistant padding 132, 134 attached to an interior surface 130 of each thyroid guard 108. In some examples, the impact-resistant padding 132, 134 also at least partially covers an interior surface 136 of the tracheal guard 106. In some examples, the impact-resistant padding 132, 134 can be made from a foam material, such as impact resistant, water resistant, foam polymer or elastomer materials such as D30® polymer material, or other similar types of material.

Figure 6:
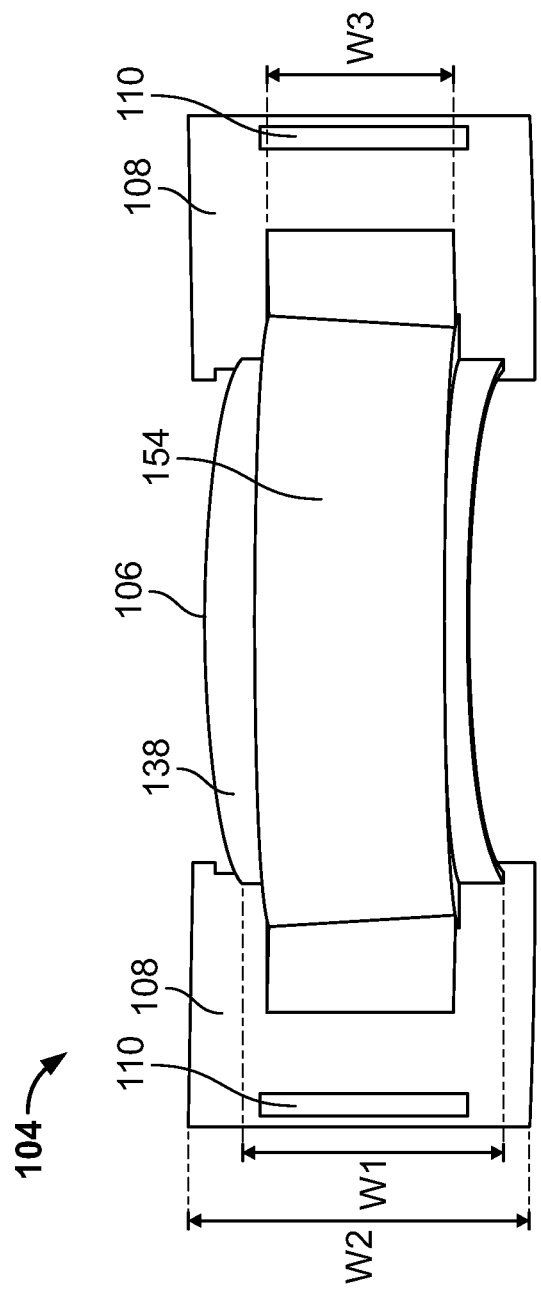
FIG. 6 is a front view of the tracheal cup of FIG. 4.
Figure 7:
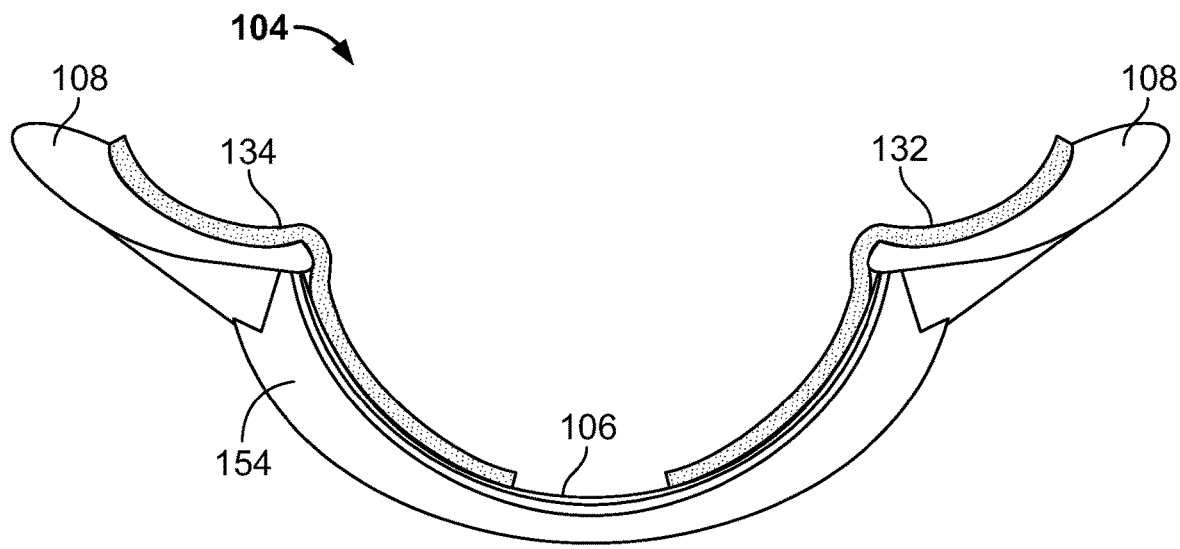
FIG. 7 is a top view of the tracheal cup of FIG. 4.

FIG. 6 is a front view of the tracheal cup 104. FIG. 7 is a top view of the tracheal cup 104. Referring now to FIGS. 4-7, the tracheal guard 106 has a concave shape, and each thyroid guard 108 also has a concave shape. The concave shape of the tracheal guard 106 and each thyroid guard 108 can reduce collar trauma to critical neck structures of an animal by providing a bowed spring action and/or shock absorption action when the animal restraint 100 is pulled. Also, the concave shapes of the tracheal guard 106 and thyroid guards 108 allow the tracheal cup 104 to flex outward and away from the trachea and other sensitive neck structures so that the tracheal cup 104 can press against stronger neck muscles which can better withstand a force from a pull of the animal restraint 100. Additionally, the impact-resistant padding 132, 134 can provide cushioning to further reduce collar trauma.

As shown in FIG. 6, the thyroid guards 108 have a width W2 that is larger than a width W1 of the tracheal guard 106. The larger width W2 of the thyroid guards 108 can help distribute the force applied to the thyroid glands of the animal when the animal restraint 100 is pulled around the neck of an animal, and thereby further reduce the collar trauma. In some examples, the width W2 is in a range from 15% to 45% larger than the width W1. In some examples, the width W2 is in a range from 0.5 to 1.5 inches, and the width W1 is in a range from 0.5 to 1.5 inches. In some alternative examples, the width W2 can be the same or substantially similar to the width W1.

As shown in FIGS. 5 and 6, the tracheal cup 104 further includes an outer band 154 that abuts an exterior surface 138 of the tracheal guard 106. As shown in FIG. 2, the outer band 154 can help guide the strap 112 around the outside perimeter of the tracheal cup 104. As shown in FIG. 6, the outer band 154 has a width W3. In some examples, the width W3 of the outer band 154 is in a range from 15% to 35% smaller than the width W1 of the tracheal guard 106. In certain examples, the width W3 of the outer band 154 is about 25% smaller than the width W1 of the tracheal guard 106.

With respect to the shape of the tracheal cup 104, the overall concave or arched shape of the tracheal cup 104 can help to distribute the majority of a pulling force to the thyroid guards 108 which are located next to the thyroid concavity of the animal when the animal restraint 100 is worn. By virtue of the larger surface area and anatomical location of the thyroid guards 108, the underlying major musculature of the animal's throat and neck absorbs the vast majority of the impact when the animal restraint 100 is pulled upon. The shock absorbing muscles involved include the sternohyoideus, sternothyroideus, and sternocephalicus muscles. These muscles are typically more resilient than the delicate underlying anatomical structures, e.g., the trachea, thyroid gland, major neck vasculature, spinal cord, and cervical nerve roots of the animal.

As shown in FIGS. 4-7, the tracheal cup 104 has several features that work in combination to help mitigate trauma to underlying throat and neck anatomical structures when a force is applied to the animal restraint 100 (e.g., by a leash). For example, (1) the overall shape including that of the tracheal cup 104 can provide a first level of protection to the underlying anatomical structures; (2) the flexibility due to the "bowed" design and materials of the tracheal cup 104 can provide a second level of protection; and (3) the impact-resistant padding 132, 134 can provide another level of protection.

Referring back to FIGS. 2 and 3, the animal restraint 100 also includes a leash guide 114. The leash guide 114 includes slots 116 on opposites ends that receive the strap 112. As shown in FIG. 2, a single strap, such as the strap 112, is threaded through the first set of slots 110 on the tracheal cup 104 and through the second set of slots 116 on the leash guide 114 to connect the tracheal cup 104 to the leash guide 114. Accordingly, the tracheal cup 104 and the leash guide 114 can work seamlessly together as a collar that can be worn around the neck of an animal such as a dog. In some examples, the slots 116 are angled grooves relative to the leash guide 114 so that the circumference of the strap 112 can be adjusted yet the strap 112 can also be maintained in a stationary position when the animal restraint 100 is worn.

As shown in FIG. 2, the strap 112 when threaded through slots 110 of each thyroid guard 108, abuts the outer band 154 of the tracheal guard 106 and an exterior surface of each thyroid guard 108 such that the strap 112 wraps around the exterior perimeter of the tracheal cup 104. Similarly, the strap 112 when threaded through slots 116 of the leash guide 114 abuts an exterior surface of an outer leash band 124 such that the strap 112 wraps around the exterior perimeter of the leash guide 114. By wrapping around the exterior surfaces of the tracheal cup 104 and the leash guide 114, the strap 112 can add an additional layer of robustness to the animal restraint 100 and can maintain a "strap appearance" that is customary to the animal collar industry.

As shown in FIGS. 2 and 3, the strap 112 can include a buckle 115 that can be used to adjust the circumference of the animal restraint 100 so that the animal restraint 100 can be fitted around various animal neck sizes. In some examples, the buckle 115 is a ladder lock type buckle or similar type of buckle for adjusting strap circumference.

In some examples, the tracheal cup 104 and the leash guide 114 are sized according to the neck circumference of various animal sizes (e.g., small, medium, large, etc.). In some examples, the leash guide 114 can be sized to cover about 50% of the neck circumference of an animal, and the tracheal cup 104 can be sized to cover about 10-15% of the neck circumference of the animal (the remaining circumference around the neck can be covered by the strap 112, the circumference of which can be adjusted using the buckle 115). The tracheal cup 104, the leash guide 114, and the strap 112 can be packaged in sizes such as extra-small, small, medium, large, extra-large, etc. so that the animal restraint 100 can be fitted around animals of various sizes.

As also shown in FIGS. 2 and 3, the strap 112 includes an attachment device 118 for securing the animal restraint around the neck of an animal. In some examples, the attachment device 118 is a snap-fit buckle. In such examples, the snap-fit buckle can include a frame 120 at one end of the strap 112, and a pair of prongs 122 at an opposite end of the strap 112. The pair of prongs 122 can snap-fit into the frame 120 to secure the animal restraint 100 around the neck of an animal. Once secured around the neck of the animal, the prongs 122 can be pushed inwardly to release the prongs 122 from the frame 120, and to remove the animal restraint 100 from the neck of an animal. In alternative examples, it is contemplated that other types of attachment devices such as hook-and-loop fasteners, buttons, etc. may be used to secure and remove the animal restraint 100 around the neck of an animal.

Figure 8:
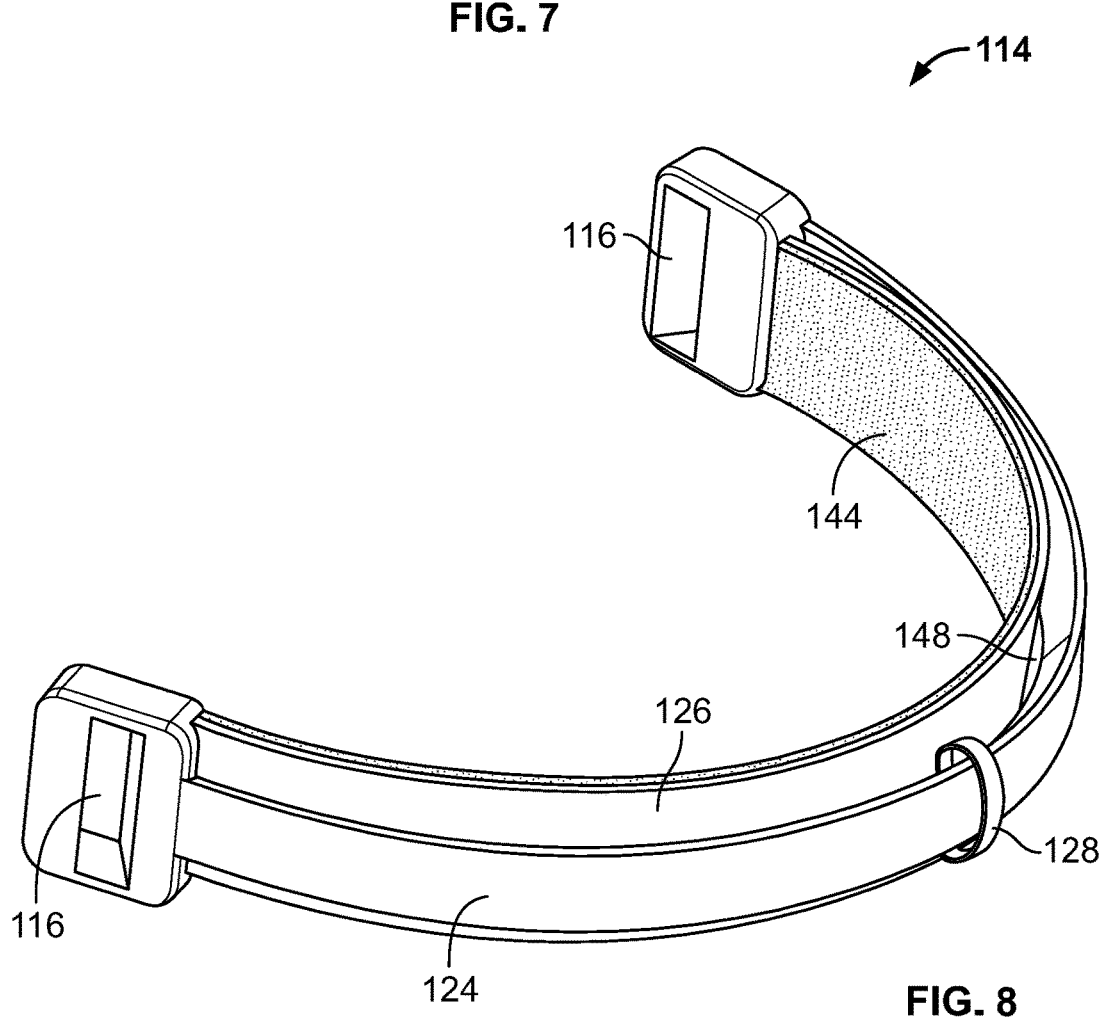
FIG. 8 is an isometric view of a leash guide according to the embodiment of the animal restraint of FIG. 1.
Figure 9:
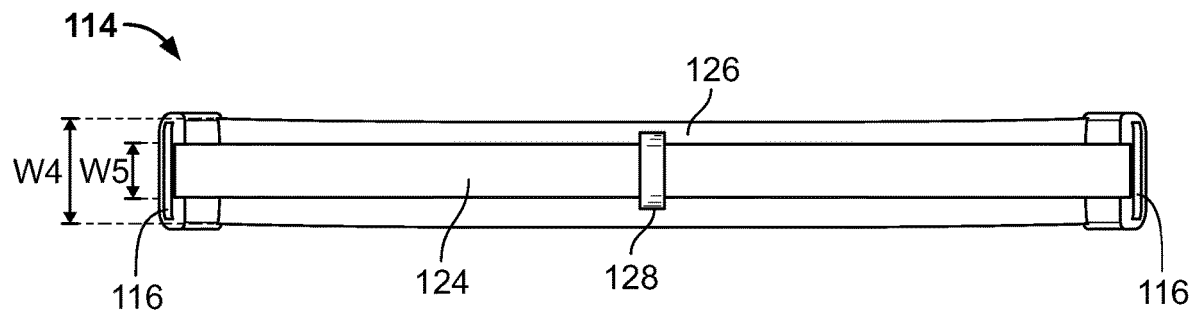
FIG. 9 is a front view of the leash guide of FIG. 8.
Figure 10:
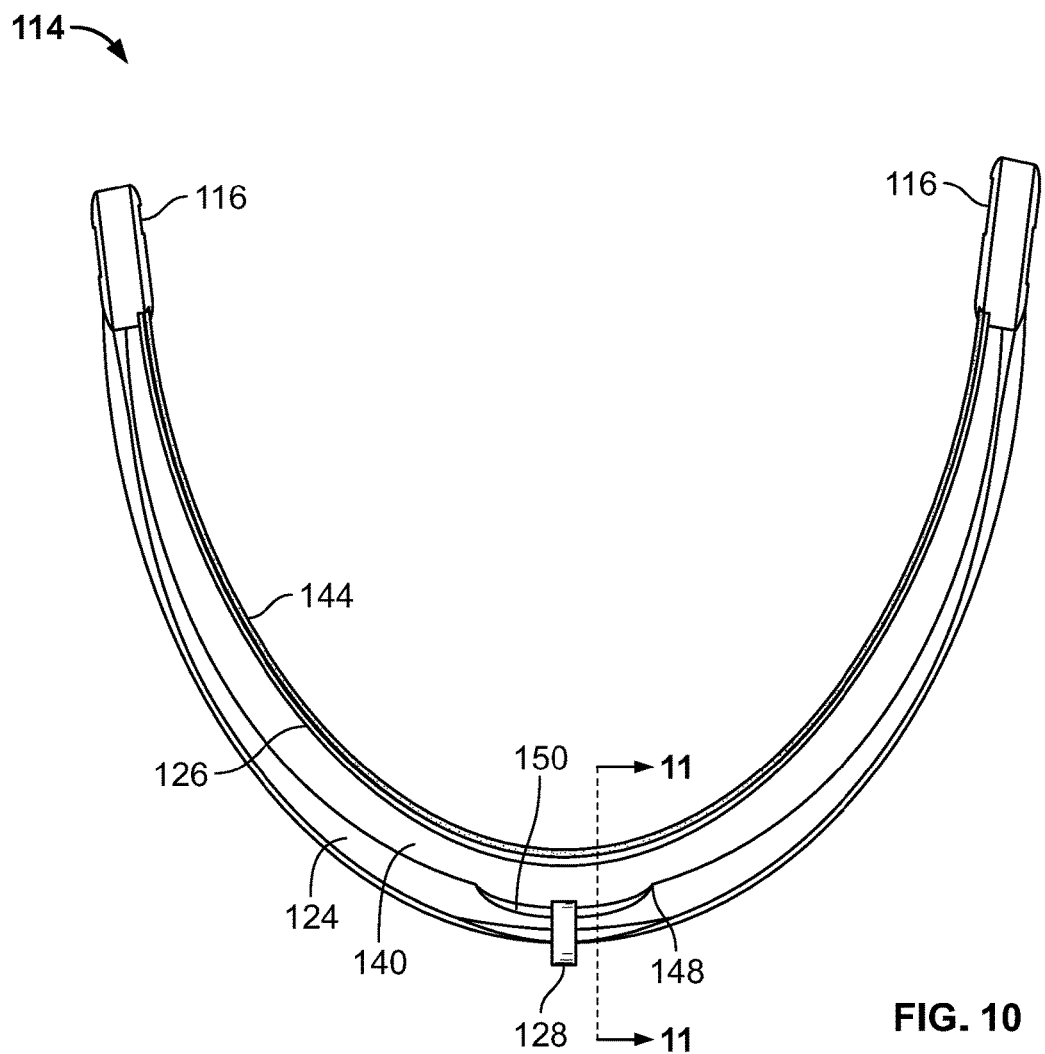
FIG. 10 is a top view of the leash guide of FIG. 8.

FIG. 8 is an isometric view of the leash guide 114. FIG. 9 is a front view of the leash guide 114. FIG. 10 is a top view of the leash guide 114. As shown in FIGS. 8-10, the leash guide 114 includes an outer leash band 124, and an inner protection band 126. The inner protection band 126 is attached to opposite ends of the outer leash band 124, and is concentrically aligned with the outer leash band 124. In some examples, the outer leash band 124 and the inner protection band 126 are made from the same durable material used to make the tracheal guard 106 and the thyroid guards 108.

Referring now to FIGS. 2, 3, and 8-10, the leash guide 114 can include a leash attachment ring 128 that can slide freely inside a space 140 between the outer leash band 124 and the inner protection band 126. A leash (not shown) can be removably attached to the leash attachment ring 128 so that an animal owner can maintain control of an animal that has the animal restraint 100 secured around its neck.

A shown in FIGS. 8-10, an impact-resistant padding 144 can cover an interior surface of the inner protection band 126. The impact-resistant padding 144 can provide cushioning between the inner protection band 126 and the neck of an animal, and thereby improve the comfort of the animal restraint 100 when worn by an animal. In some examples, the impact-resistant padding 144 is made from the same foam material as the impact-resistant padding 132, 134 on the tracheal cup 104.

As shown in FIG. 9, the inner protection band 126 has a width W4 and the outer leash band 124 has a width W5. In the example depicted in FIGS. 2, 3, and 8-10, the width W5 of the outer leash band 124 is smaller than the width W4 of the inner protection band 126. In some examples, the width W5 of the outer leash band 124 is in a range from 15% to 35% smaller than the width W4 of the inner protection band 126. In certain examples, the width W5 of the outer leash band 124 is about 25% smaller than the width W4 of the inner protection band 126.

In some examples, the width W4 of the inner protection band 126 is in a range from 0.5 to 1.5 inches. The width W4 can help distribute the forces applied to the neck of the animal when the animal restraint 100 is pulled, and thereby reduce collar trauma.

In some examples, the width W5 of the outer leash band 124 is in a range from 0.5 to 1.5 inches. The width W5 can help guide the strap 112 around the outside perimeter of the leash guide 114. Additionally, the smaller width W5 of the outer leash band 124 (as compared to the width W4 of the inner protection band 126) can minimize the chance of fur becoming tangled in the leash attachment ring 128. Also, the smaller width W5 can decrease the surface area of the outer leash band 124 upon which the leash attachment ring 128 glides, thereby decreasing the friction on the leash attachment ring 128 when the leash attachment ring 128 glides on the outer leash band 124.

As shown in FIGS. 8 and 10, the outer leash band 124 includes a repositioning recess 148. The repositioning recess 148 can engage and temporarily hold the leash attachment ring 128 when the leash attachment ring 128 is pulled by a leash (not shown) to restrain the movement of an animal. Thus, the repositioning recess 148 can help to center the leash attachment ring 128 on the outer leash band 124.

As shown in FIG. 10, a magnet 150 can be attached to the repositioning recess 148 or can be embedded inside the repositioning recess 148, or embedded along the superior segment of the outer leash band 124, and the leash attachment ring 128 can be made from a ferromagnetic material that is magnetically attracted to the magnet 150 in the repositioning recess 148 to help center the leash attachment ring 128 on the outer leash band 124. In other alternative examples, a piece of ferromagnetic material can be attached to the repositioning recess 148 or can be embedded inside the repositioning recess 148, and the leash attachment ring 128 can be a magnet that is attracted to the piece of ferromagnetic material in the repositioning recess 148 to help center the leash attachment ring 128 on the outer leash band 124. The centering of the leash attachment ring 128 in the superior segment of the outer leash band 124 elevates the sagging portion of the leash when the animal is loose-leash walking. The positioning of the leash attachment ring 128 on the superior segment of the outer leash band 124 can thus help to prevent entanglement of the leash in the legs of the animal.

Referring back to FIGS. 2 and 3, the strap 112 can include an alignment guide 152. The alignment guide 152 can be used to indicate whether the leash attachment ring 128 is centrally aligned along the outer leash band 124 (e.g., within the repositioning recess 148). In some examples, the alignment guide 152 can be made from a reflective or brightly colored material (e.g., neon orange or yellow) to improve its visibility.

Figure 11:
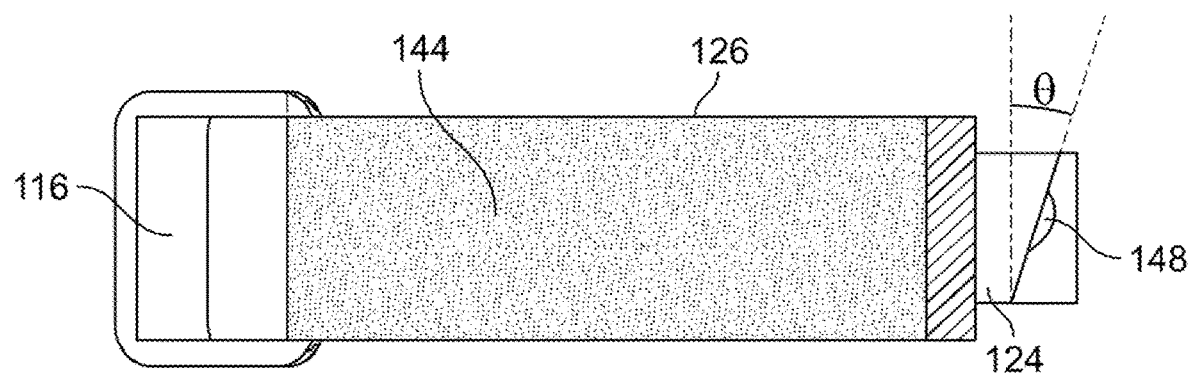
FIG. 11 is a cross sectional view of the leash guide of FIG. 8.

FIG. 11 is a cross sectional view of the leash guide 114. As shown in FIG. 11, the outer leash band 124 is angled (i.e., offset) with respect to the inner protection band 126. The offset of the outer leash band 124 relative to the inner protection band 126 provides a smoother glide for the leash attachment ring 128 on the outer leash band 124 when a leash (shown in FIG. 12) attached to the leash attachment ring 128 is pulled while walking an animal with the animal restraint 100 attached thereto. In some examples, the outer leash band 124 is offset relative to the inner protection band 126 by an angle θ in a range from 20 degrees to 40 degrees. In certain examples, the outer leash band 124 is offset relative to the inner protection band 126 by an angle θ of 30 degrees.

Figure 12:
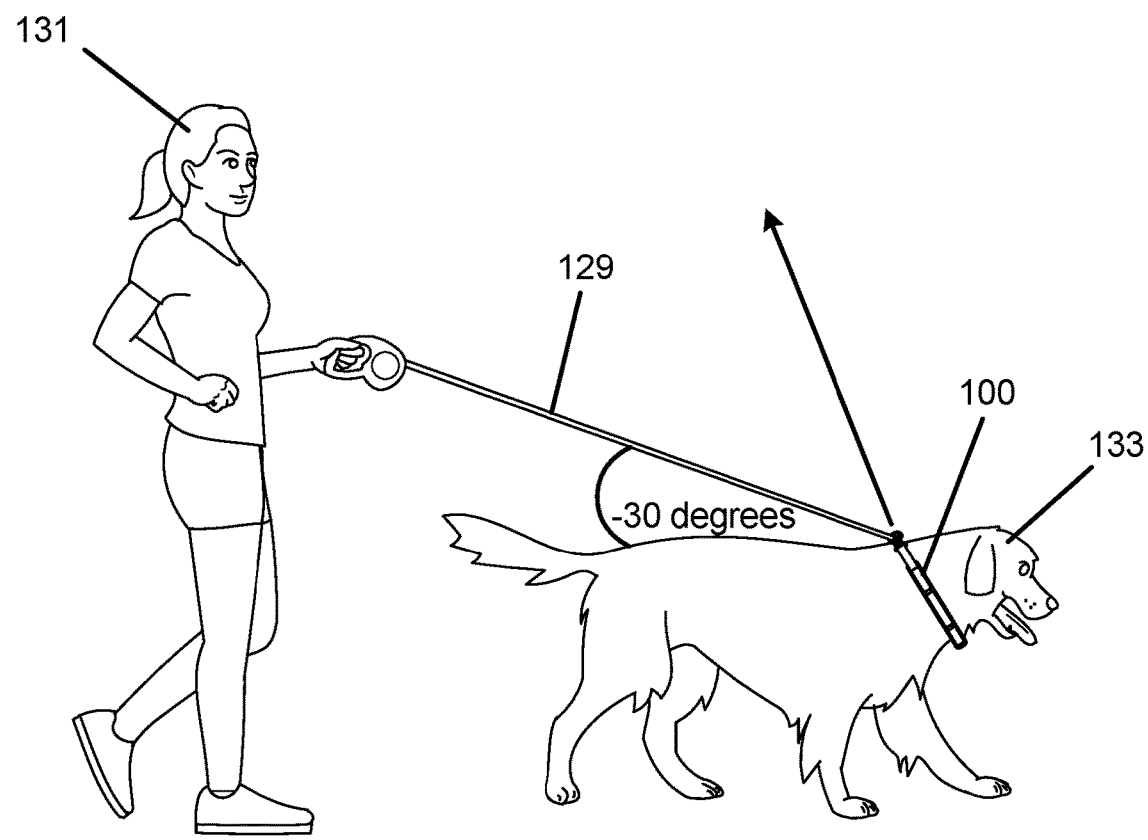
FIG. 12 is a view of an owner behind an animal fitted with the animal restraint.

FIG. 12 is a view of an owner 131 behind an animal 133 fitted with the animal restraint 100. As shown in FIG. 12, the offset of the outer leash band 124 relative to the inner protection band 126 (see FIG. 11) can help to maintain the natural gait and walking position of the animal 133. Also, the offset can help to maintain the animal restraint 100 in a proper anterior-posterior alignment, and ensure that the location of the tracheal cup 104 and leash guide 114 relative to the anatomical neck structures of the animal does not shift when the animal restraint is worn. Additionally, the smoother glide that results from the offset of the outer leash band 124 relative to the inner protection band 126 can reduce the force and/or friction applied by the leash attachment ring 128 to the outer leash band 124 when the leash 129 is pulled.

Referring now to FIGS. 1, 2, 11, and 12, the glide movement of the leash attachment ring 128 on the leash guide 114 can help to prevent the animal restraint 100 from shifting relative to the anatomical neck structures of the animal, and can therefore help to maintain the proper anatomical location of the animal restraint 100 such that the tracheal cup 104 can remain in place over the trachea and thyroid anatomical structures of the animal. Also, the glide movement of the leash attachment ring 128 on the leash guide 114 can help to minimize gait abnormalities when walking the animal. For example, long walks can include gait disturbances that can cause pain due to overuse syndromes, connective tissue trauma, and inflammation. In at least some examples, the leash guide 114 can provide a glide movement of about 180 degrees.

Figure 13:
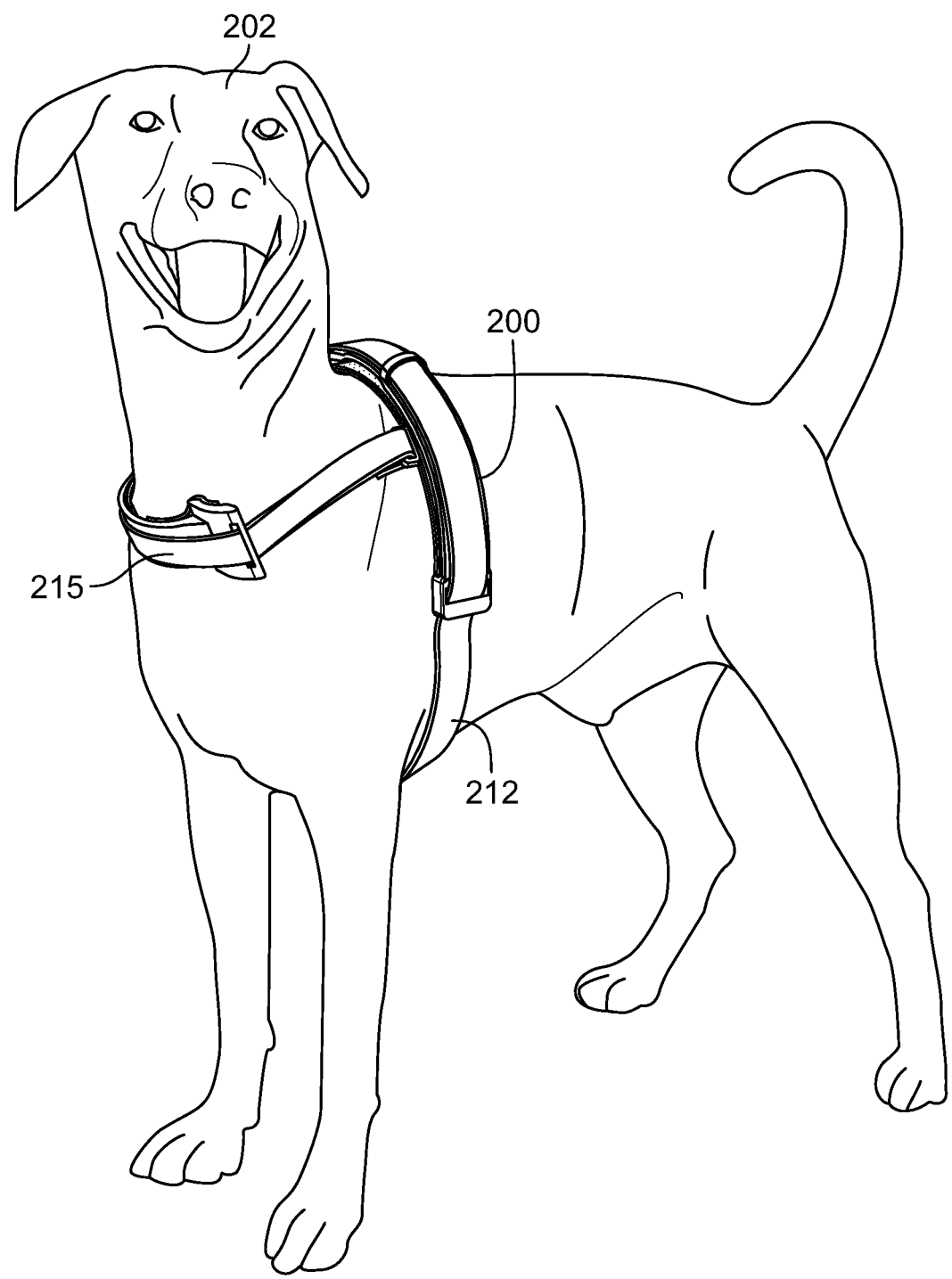
FIG. 13 is an isometric view of an animal restraint around the neck of an animal, in accordance with another embodiment of the present disclosure.

FIG. 13 is an isometric view of an animal restraint 200 around the neck and body of an animal 202, in accordance with another embodiment of the present disclosure. As shown in FIG. 13, the animal restraint 200 is a harness. The animal restraint 200 can mitigate collar trauma to critical neck structures of the animal 202. Although the animal 202 in FIG. 13 is depicted as a dog, it is contemplated that the animal restraint 200 can be used to restrain various types of animals.

Figure 14:
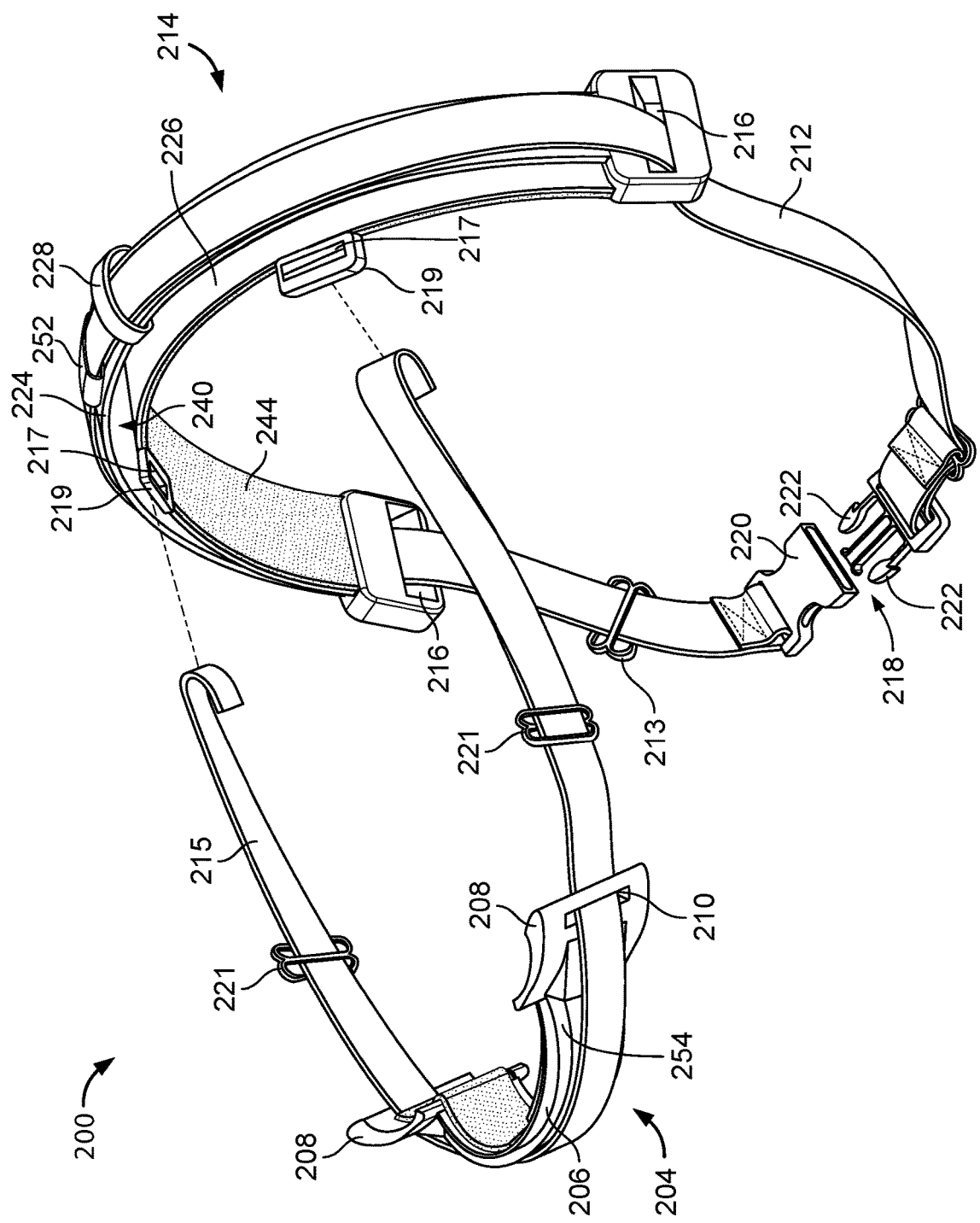
FIG. 14 is an isometric, partially dissembled view of the animal restraint according to the embodiment of FIG. 13.

FIG. 14 is a partially disassembled isometric view of the animal restraint 200. As shown in FIG. 14, a strap 215 can be threaded through a first set of slots 210 on opposite ends of a tracheal cup 204. Another strap 212 can be threaded through a second set of slots 216 on opposite ends of a leash guide 214. Additionally, opposite ends of the strap 215 can be threaded through a third set of slots 217 on the leash guide 214 for connecting the tracheal cup 204 to the leash guide 214. In some examples, the first set of slots 210, the second set of slots 216, and the third set of slots 217 are angled grooves that allow the circumferences of the strap 212 and the strap 215 to be adjusted.

As shown in FIG. 14, the strap 215 can include buckles 221 that can be used to adjust the distance between the tracheal cup 204 and the leash guide 214 so that the animal restraint 200 can be fitted around various neck sizes. Similarly, the strap 212 can include a buckle 213 that can be used to adjust the circumference of the strap 212 so that the animal restraint 200 can be fitted around various thorax sizes. The buckles 213 and 221 can be ladder lock type buckles or other similar types of buckles.

In some examples, the tracheal cup 204 and the leash guide 214 are sized according to the neck circumference and the thorax circumference of animals of various sizes (e.g., small, medium, large, etc.). In some examples, the leash guide 214 can be sized to cover about 50% of the thorax circumference of an animal (the remaining circumference around the thorax of the animal can be covered by the strap 212, the circumference of which can be adjusted using the buckle 213). In some examples, the tracheal cup 204 can be sized to cover about 10-15% of the neck circumference of an animal (the remaining circumference around the neck can be covered by the strap 215, the circumference of which can be adjusted using the buckles 221). The tracheal cup 204, the leash guide 214, and the straps 212 and can be packaged in sizes such as extra-small, small, medium, large, extra-large, etc. so that the animal restraint 200 can be fitted around animals of various sizes.

As shown in FIG. 14, the strap 212 further includes an attachment device 218 for securing the animal restraint 200 around the thorax of an animal. In some examples, the attachment device 218 is a snap-fit buckle. In such examples, the snap-fit buckle can include a frame 220 at one end of the strap 212, and a pair of prongs 222 at an opposite end of the strap 212. The pair of prongs 222 can snap-fit into the frame 220 to secure the animal restraint 200 around the body of an animal. Once secured around the body of the animal, the prongs 222 can be pushed inwardly to release the prongs 222 from the frame 220, and to remove the animal restraint 200 from the body of an animal. In alternative examples, it is contemplated that other types of attachment devices such as hook-and-loop fasteners, buttons, etc. may be used to secure and remove the animal restraint 200 around the thorax of an animal.

Figure 15:
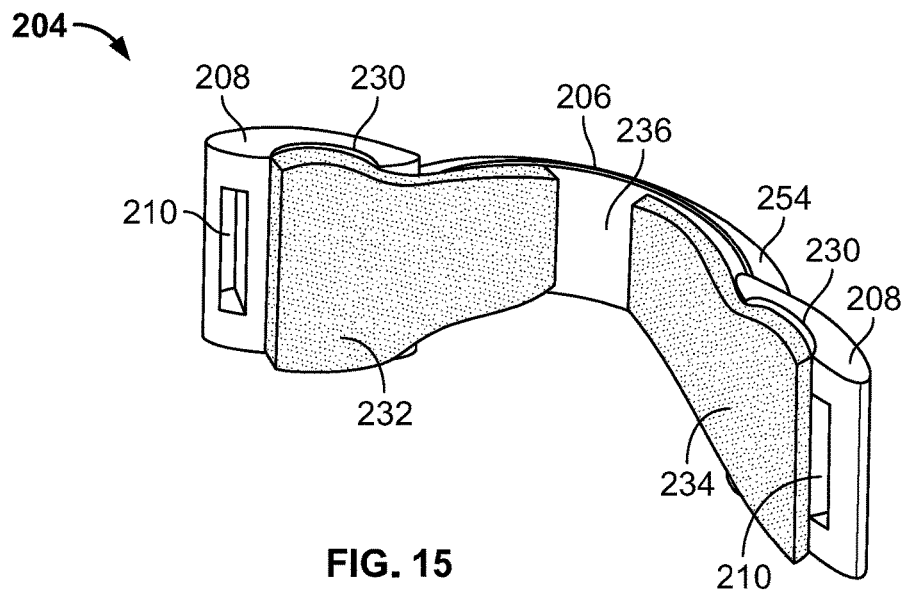
FIG. 15 is a rear isometric view of a tracheal cup according to the embodiment of the animal restraint of FIG. 13.

FIG. 15 is a rear isometric view of the tracheal cup 204. The tracheal cup 204 is substantially similar to the tracheal cup 104 described above. As shown in FIG. 15, the tracheal cup 204 includes a tracheal guard 206, and thyroid guards 208 extending from opposite ends of the tracheal guard 206. The first set of slots 210 on the tracheal cup 204 each receive the strap 215 (shown in FIG. 14). In some examples, the slots 210 are angled grooves relative to the thyroid guards 208 so that the circumference of the strap 215 can be adjusted yet the strap 215 can also be maintained in a stationary position when the animal restraint 200 is worn by an animal. In some examples, the tracheal guard 206 and the thyroid guards 208 can be made from the same durable and flexible material used to make the tracheal cup 104, as described above.

The tracheal cup 204 can also include impact-resistant padding 232, 234 attached to an interior surface 230 of each thyroid guard 208. In some examples, the impact-resistant padding 232, 234 also at least partially covers an interior surface 236 of the tracheal guard 206. In some examples, the impact-resistant padding 232, 234 can be made from the same soft foam material used for the impact-resistant padding 132, 134.

Figure 16:
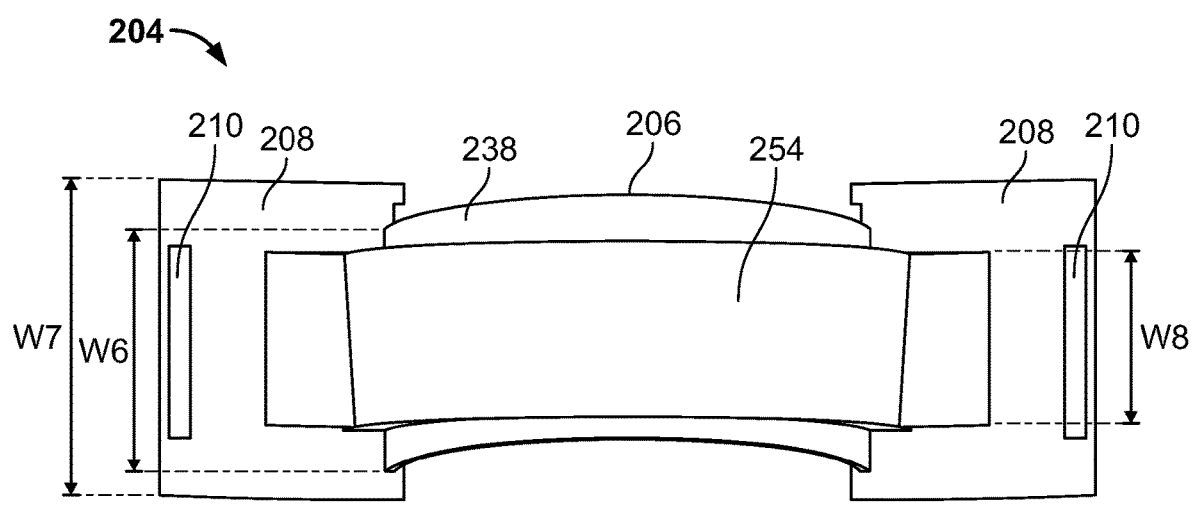
FIG. 16 is a front view of the tracheal cup of FIG. 15.
Figure 17:
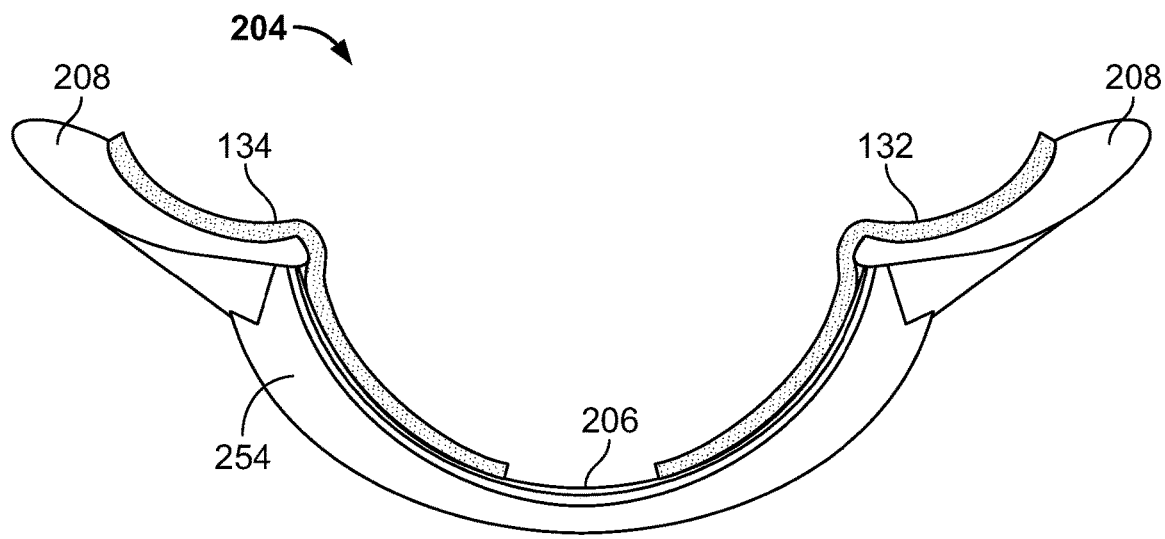
FIG. 17 is a top view of the tracheal cup of FIG. 15.

FIG. 16 is a front view of the tracheal cup 204. FIG. 17 is a top view of the tracheal cup 204. Referring now to FIGS. 15-17, the tracheal guard 206 has a concave shape, and each thyroid guard 208 also has a concave shape. The concave shape of the tracheal guard 206 and each thyroid guard 208 can reduce collar trauma to critical neck structures of an animal by providing a bowed spring action and/or shock absorption action when the animal restraint 200 is pulled. Also, the concave shapes of the tracheal guard 206 and thyroid guards 208 allow the tracheal cup 204 to flex outward and away from the trachea and other sensitive neck structures. Instead, the tracheal cup 204 can press against stronger neck muscles which can better withstand a force from a pull of the animal restraint 200. Additionally, the impact-resistant padding 232, 234 can provide cushioning to further reduce collar trauma.

As shown in FIG. 16, the thyroid guards 208 have a width W7 that is larger than a width W6 of the tracheal guard 206. The larger width W7 of the thyroid guards 208 can help distribute the force applied to the thyroid glands of the animal when the animal restraint 200 is pulled around the neck of an animal, and thereby further reduce the collar trauma. In some examples, the width W7 is in a range from 15% to 45% larger than the width W6. In some examples, the width W7 is in a range from 0.5 to 1.5 inches, and the width W6 is in a range from 0.5 to 1.5 inches. In some alternative examples, the width W7 can be the same or substantially similar to the width W6.

As shown in FIGS. 12 and 14, the tracheal cup 204 further includes an outer band 254 that abuts an exterior surface 238 of the tracheal guard 206. As shown in FIG. 14, the outer band 254 guides the strap 215 around the outside perimeter of the tracheal cup 204. For example, as shown in FIG. 14, when the strap 215 is threaded through the first set of slots 210 of the tracheal cup 204, the strap 215 abuts the outer band 254 of the tracheal guard 206 and an exterior surface of each thyroid guard 208 such that the strap 215 wraps around the exterior perimeter of the tracheal cup 204, and thereby provides an additional layer of robustness and provides a "strap appearance."

As shown in FIG. 16, the outer band 254 has a width W8. In some examples, the width W8 of the outer band 254 is in a range from 15% to 35% smaller than the width W6 of the tracheal guard 206. In certain examples, the width W8 of the outer band 254 is about 25% smaller than the width W6 of the tracheal guard 206.

Figure 18:
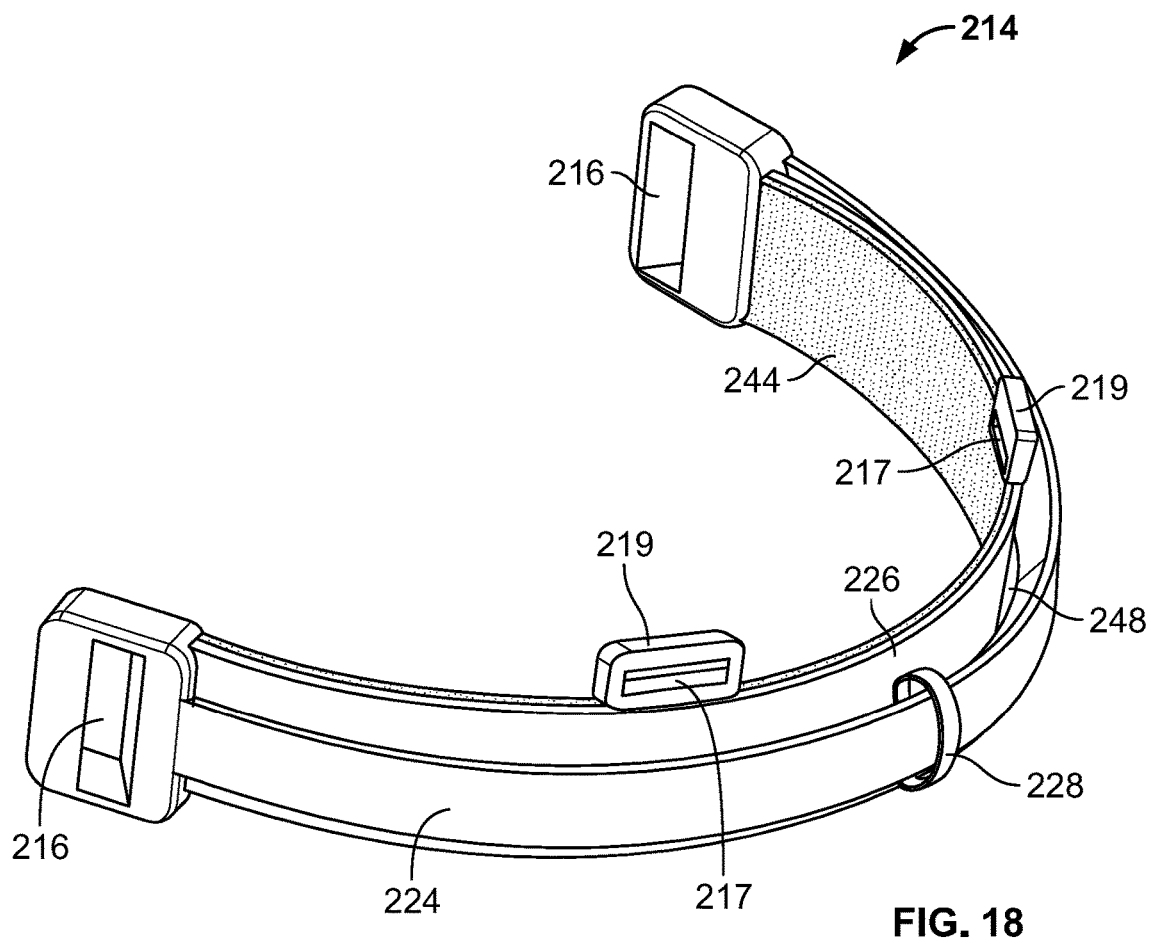
FIG. 18 is an isometric view of a leash guide according to the embodiment of the animal restraint of FIG. 13.
Figure 19:
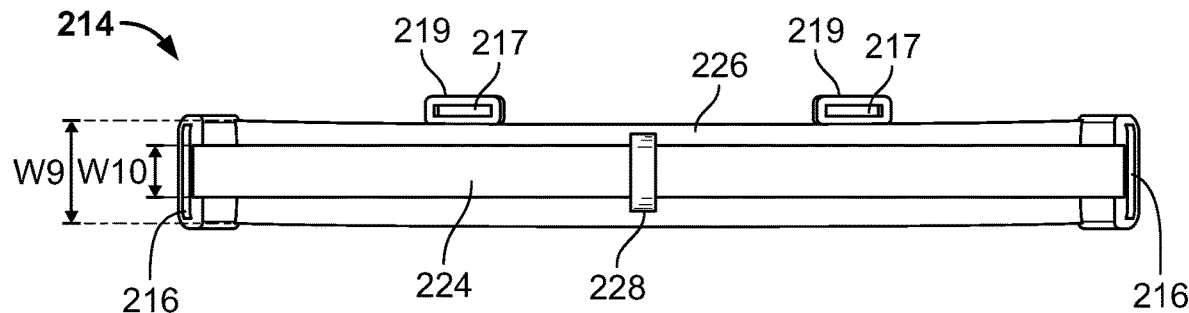
FIG. 19 is a front view of the leash guide of FIG. 18.
Figure 20:
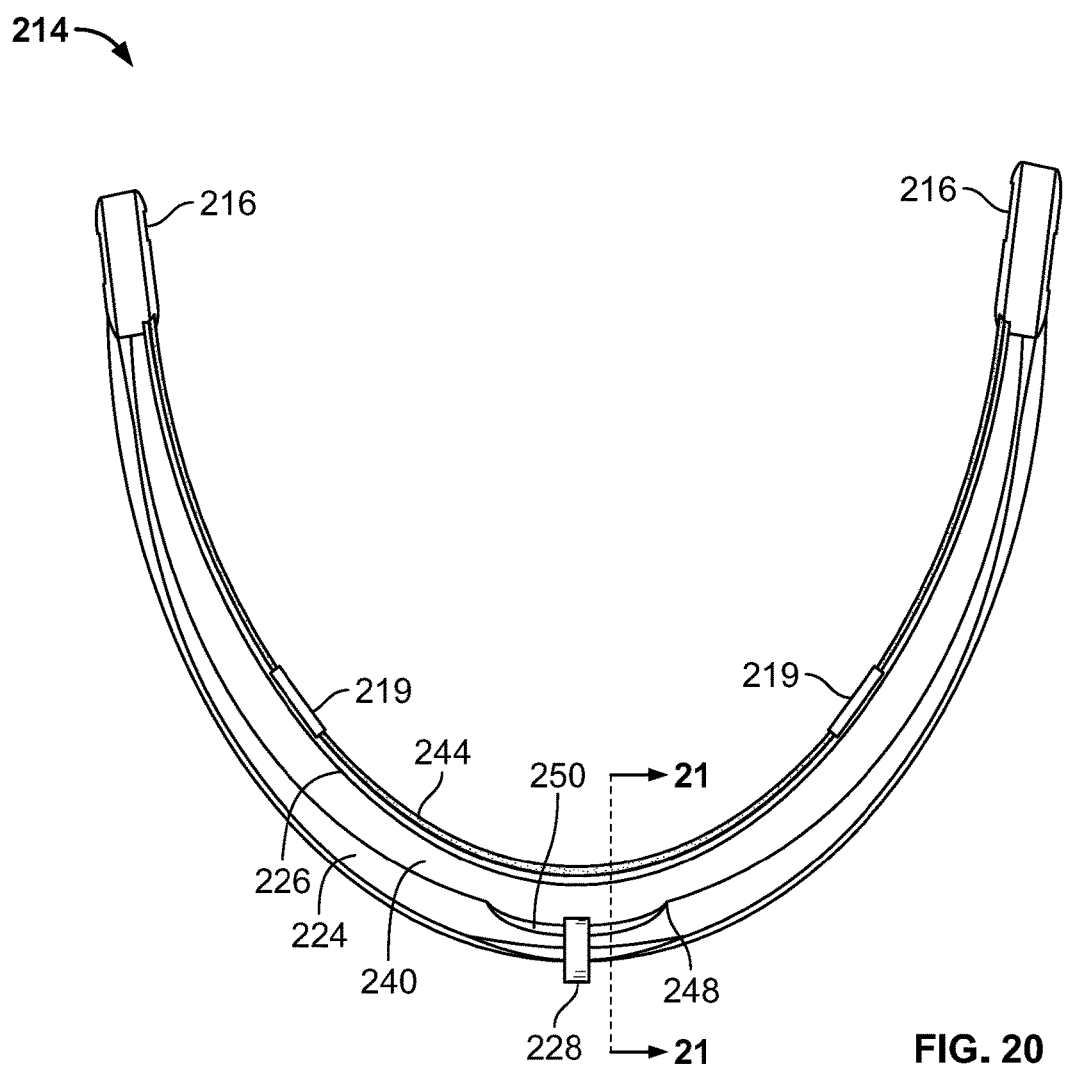
FIG. 20 is a top view of the leash guide of FIG. 18.

FIG. 18 is an isometric view of the leash guide 214. FIG. 19 is a front view of the leash guide 214. FIG. 20 is a top view of the leash guide 214. The leash guide 214 is substantially similar to the leash guide 114 described above. As shown in FIGS. 16-18, the leash guide 214 includes an outer leash band 224 and an inner protection band 226. The inner protection band 226 is attached to opposite ends of the outer leash band 224, and is concentrically aligned with the outer leash band 224. The inner protection band 226 includes tabs 219 that extend from a side surface. Each tab 219 includes a slot 217 that can receive an end of the strap 215 (shown in FIG. 14). In some examples, the outer leash band 224 and the inner protection band 226 are made from the same durable material used to make the tracheal guard 206 and the thyroid guards 208.

As shown in FIGS. 12 and 16-18, the leash guide 214 can include a leash attachment ring 228 that can slide freely inside a space 240 between the outer leash band 224 and the inner protection band 226. A leash (not shown) can be removably attached to the leash attachment ring 228 so that an animal owner can maintain control of an animal that has the animal restraint 200 secured around its neck and body.

A shown in FIGS. 12 and 16-18, an impact-resistant padding 244 covers an interior surface of the inner protection band 226. The impact-resistant padding 244 can provide additional cushioning between the inner protection band 226 and the back of an animal. In some examples, the impact-resistant padding 244 is made from the same foam material as the impact-resistant padding 232, 234 on the tracheal cup 204.

As shown in FIG. 19, the inner protection band 226 has a width W9 and the outer leash band 224 has a width W10. In the example embodiments depicted in FIGS. 12 and 16-18, the width W10 of the outer leash band 224 is smaller than the width W9 of the inner protection band 226. In some examples, the width W10 of the outer leash band 224 is in a range from 15% to 35% smaller than the width W9 of the inner protection band 226. In certain examples, the width W10 of the outer leash band 224 is about 25% smaller than the width W9 of the inner protection band 226.

In some examples, the width W9 of the inner protection band 226 is in a range from 0.5 to 1.5 inches. The width W9 of the inner protection band 226 can help to distribute the forces applied to the back of an animal when the animal restraint 200 is pulled, and thereby reduce back trauma caused by pulling the animal restraint 200.

In some examples, the width W10 of the outer leash band 224 is in a range from 0.5 to 1.5 inches. The width W10 of the outer leash band 224 can help guides the strap 212 around the outside perimeter of the leash guide 214 to provide an additional layer of robustness and a "strap appearance." Additionally, the width W10 of the outer leash band 224 (which is smaller than the width W9) can help minimize the chance of fur becoming tangled in the leash attachment ring 228. Also, the smaller width W10 can decrease the surface area of the outer leash band 224 upon which the leash attachment ring 228 glides, thereby decreasing the friction on the leash attachment ring 228 when the leash attachment ring 228 glides along the outer leash band 224.

As shown in FIGS. 16 and 18, the outer leash band 224 includes a repositioning recess 248. The repositioning recess 248 can engage and temporarily hold the leash attachment ring 228 when the leash attachment ring 228 is pulled by a leash (not shown) to restrain the movement of an animal. Thus, when a human owner is directly behind an animal with the animal restraint 200 attached thereto, the repositioning recess 248 can help to center the leash attachment ring 228 on the outer leash band 224, and the pulling force applied by the leash to the animal restraint 200 can reposition and align the animal restraint 200 into a proper anterior-posterior alignment.

As shown in FIG. 20, a magnet 250 can be attached to the repositioning recess 248 or can be embedded inside the repositioning recess 248, and the leash attachment ring 228 can be made from a ferromagnetic material that is magnetically attracted to the magnet 250 to help center the leash attachment ring 228 on the outer leash band 224. In alternative examples, ferromagnetic material can be attached to or can be embedded inside the repositioning recess 248, and the leash attachment ring 228 can be a magnet that is attracted to the ferromagnetic material in the repositioning recess 248 to help center the leash attachment ring 228 on the outer leash band 224.

The repositioning recess 248 allows the animal restraint 200 to be less likely to become tangled in the legs of the animal when loose-leash walking (loose-leash walking is a desired dog walking position; however, even the most well trained animals can pull on the leash after becoming distracted by other dogs or animals). Additionally, the repositioning recess 248 can reduce the distance that the leash attachment ring 228 travels on the outer leash band 224, which can reduce the lateral force and/or movement applied to the leash guide 214 from pulling the leash, and can thereby maintain a proper anterior-posterior alignment between a human owner holding the leash and an animal with the animal restraint 200 attached thereto.

Referring back to FIG. 14, the strap 212 can include an alignment guide 252. The alignment guide 252 can be used to indicate whether the leash attachment ring 228 is centrally aligned along the outer leash band 224 (e.g., within the repositioning recess 248). In some examples, the alignment guide 252 can be made from a reflective or brightly colored material (e.g., neon orange or yellow) to improve its visibility.

Figure 21:
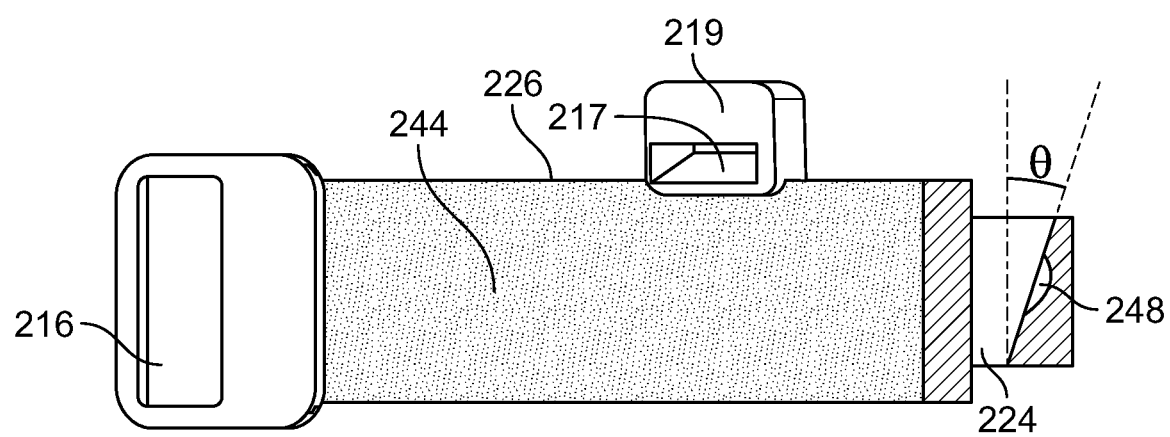
FIG. 21 is a cross sectional view of the leash guide of FIG. 18.

FIG. 21 is a cross sectional view of the leash guide 214. As shown in FIG. 21, the outer leash band 224 is angled (i.e., offset) with respect to the inner protection band 226. The offset of the outer leash band 224 relative to the inner protection band 226 provides a smoother glide for the leash attachment ring 228 on the outer leash band 224 when the leash attachment ring 228 is pulled by a leash while walking an animal.

The offset of the outer leash band 224 relative to the inner protection band 226 can help to maintain the natural gait and walking position of the animal. Also, the offset can help to reposition and align the animal restraint 200 into a proper anterior-posterior alignment, and ensure that such that the location of the tracheal cup 104 relative to the anatomical neck structures of the animal does not shift when the animal restraint is worn. Additionally, the smoother glide that results from the offset of the outer leash band 224 relative to the inner protection band 226 can reduce the force and/or friction applied by the leash attachment ring 228 to the outer leash band 224 when the leash is pulled. In some examples, the outer leash band 124 is offset relative to the inner protection band 126 in a range from 20 degrees to 40 degrees. In certain examples, the outer leash band 124 is offset relative to the inner protection band 126 by 30 degrees.

Figure 22:
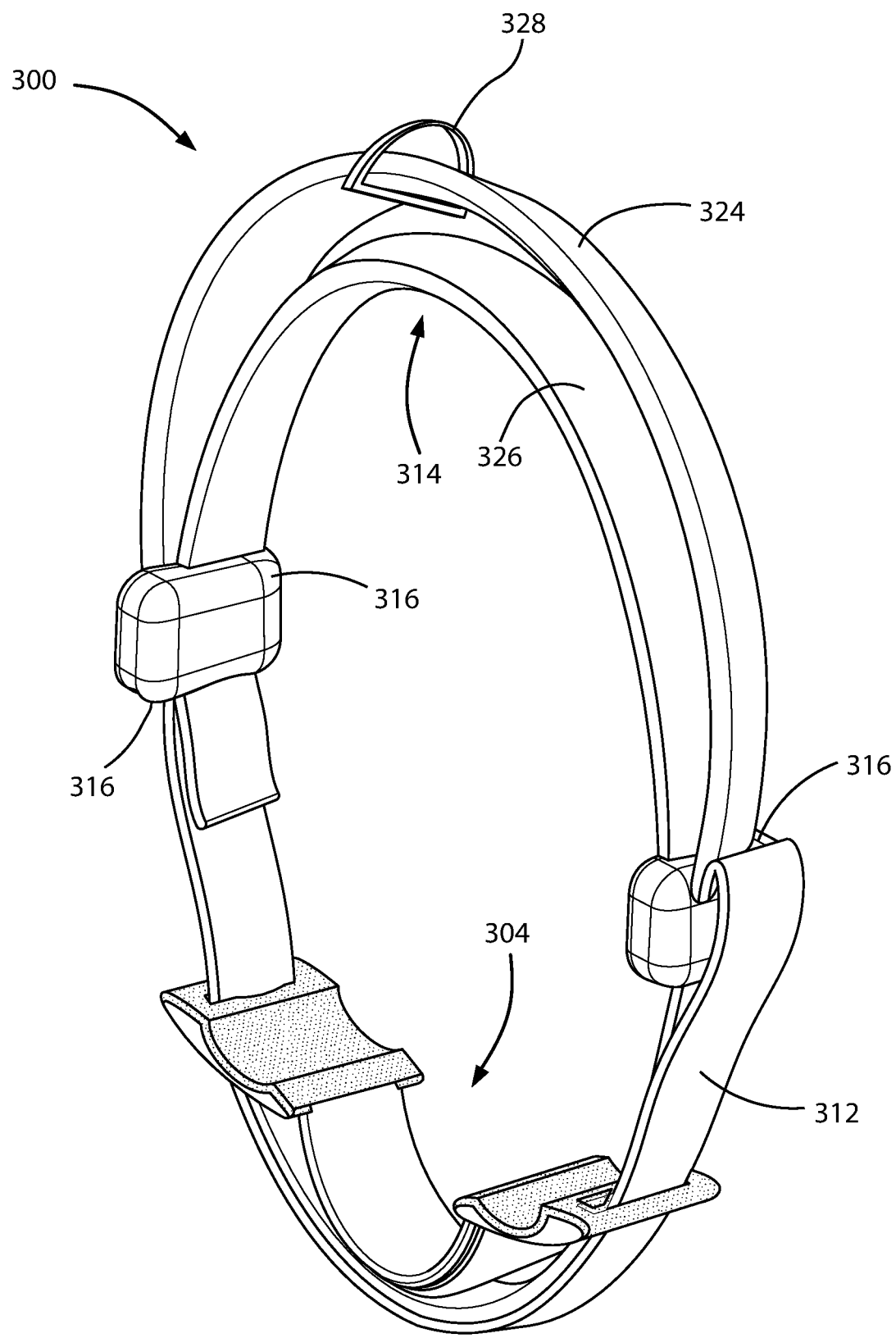
FIG. 22 is an isometric view of an animal restraint in accordance with another embodiment of the present disclosure.

FIG. 22 is an isometric view of an animal restraint 300 in accordance with another embodiment of the present disclosure. As shown in FIG. 22, the animal restraint 300 includes a tracheal cup 304 substantially similar to the tracheal cup 104 and the tracheal cup 204 described above. The animal restraint 300 further includes a leash guide 314 and a strap 312. The strap 312 can adjustably connect the leash guide 314 to the tracheal cup 304. The tracheal cup 304 and the leash guide 314 can be made from the same material used for the tracheal cup 104 and the leash guide 114.

As shown in FIG. 22, the leash guide 314 includes an outer leash band 324, and an inner protection band 326. The outer leash band 324 is attached to opposite ends of the inner protection band 326. As shown in FIG. 22, the outer leash band 324 is angled relative to the inner protection band 326. The angular offset of the outer leash band 324 relative to the inner protection band 326 provides a smoother glide for a leash attachment ring 328 that can glide on the outer leash band 324 when a leash attached to the leash attachment ring 328 is pulled while walking an animal.

In some examples, the outer leash band 324 is angularly offset relative to the inner protection band 326 by an angle in a range from 20 degrees to 40 degrees. In certain examples, the outer leash band 324 is angularly offset relative to the inner protection band 326 by an angle of 30 degrees.

As further shown in FIG. 22, the strap 312 is attached to slots 316 on the opposites ends of the leash guide 314 such that the strap 312 does not go around the outside perimeter of the outer leash band 324. This can help prevent the strap 312 from bunching up around the outside perimeter of the outer leash band 324, and thus provide a smoother glide for the leash attachment ring 328 on the outer leash band 324.

Figure 23:
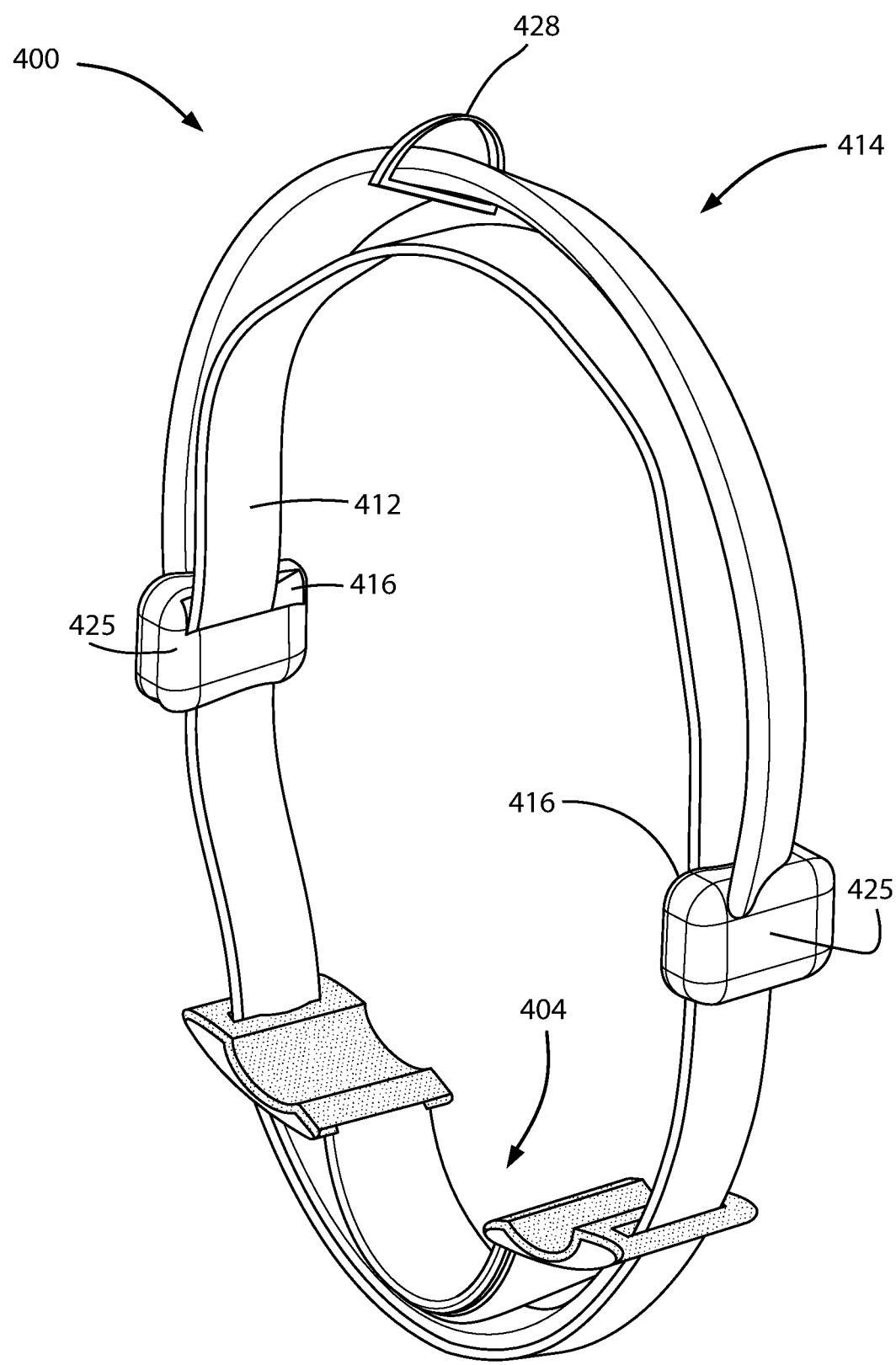
FIG. 23 is an isometric view of an animal restraint in accordance with another embodiment of the present disclosure.

FIG. 23 is an isometric view of an animal restraint 400 in accordance with another embodiment of the present disclosure. As shown in FIG. 23, the animal restraint 400 includes a tracheal cup 404 substantially similar to the tracheal cup 104 and the tracheal cup 204 described above. The animal restraint 400 further includes a leash guide 414 and a strap 412. The strap 412 can adjustably connect the leash guide 414 to the tracheal cup 404. The tracheal cup 404 and the leash guide 414 can be made from the same material used for the tracheal cup 104 and the leash guide 114.

As shown in FIG. 23, the leash guide 414 includes an outer leash band 424 having opposite ends 425. Each opposite end 425 has a slot 416 that can receive the strap 412. The leash guide 414 does not have an inner protection band, but rather the strap 412 is fed through the slots 416 of the leash guide 414 such that the strap 412 abuts the neck of the animal when the animal restraint 400 is worn.

Figure 24:
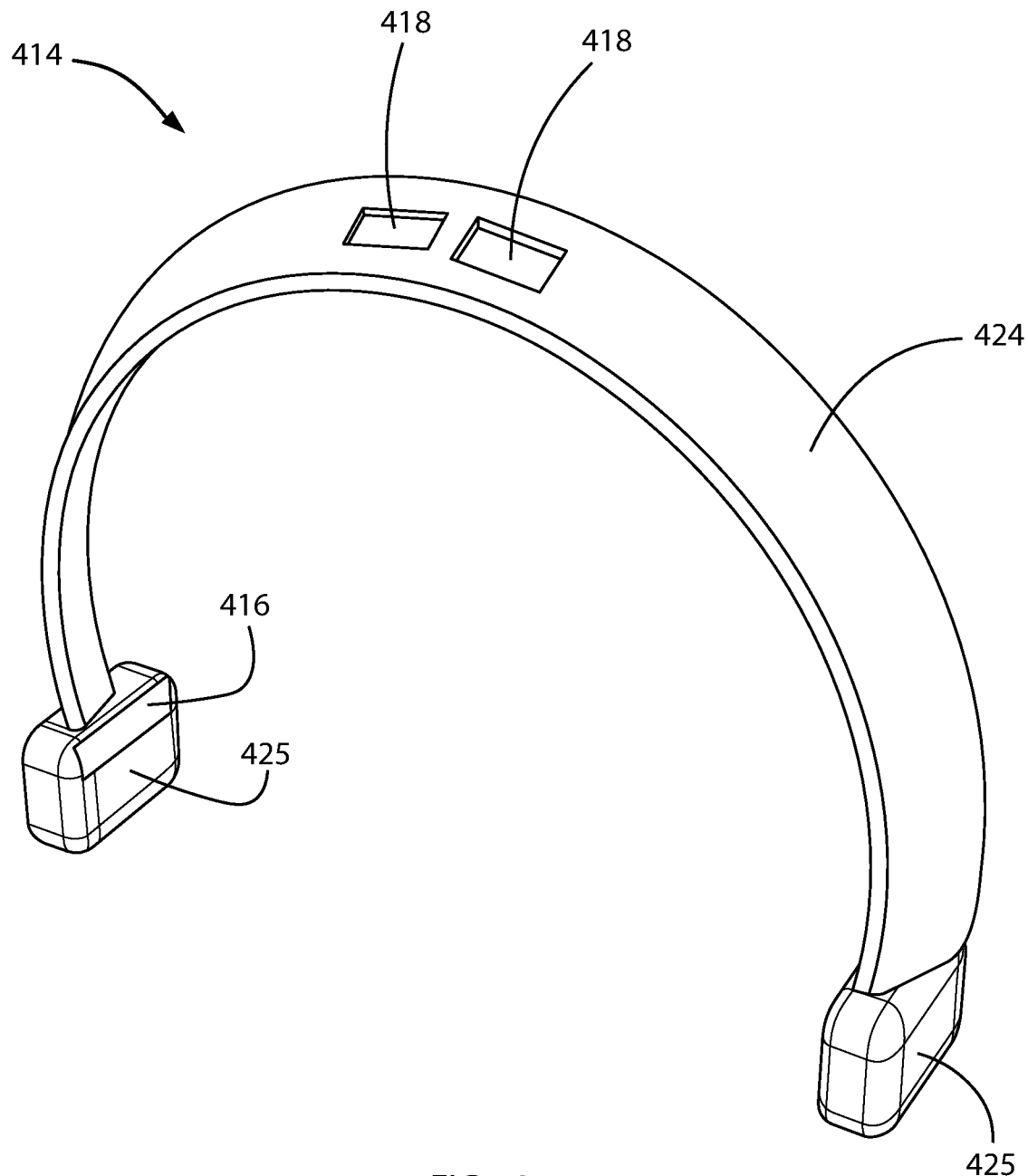
FIG. 24 is an isometric view of a leash guide animal according to the embodiment of the animal restraint of FIG. 23.

FIG. 24 is an isometric view of the leash guide 414 without the strap 412. As shown in FIGS. 23 and 24, the outer leash band 424 is angled relative to the slots 416 such that the outer leash band 424 is angled relative to the strap 412 when the strap 412 is fed through the slots 416. The angular offset of the outer leash band 424 relative to the strap 412 provides a smoother glide for a leash attachment ring 428 that can glide on the outer leash band 424 when a leash attached to the leash attachment ring 428 is pulled while walking an animal with the animal restraint 400.

In some examples, the outer leash band 424 is angularly offset relative to the slots 416 by an angle in a range from 20 degrees to 40 degrees. In certain examples, the outer leash band 424 is angularly offset relative to the slots 416 by 30 degrees.

As shown in FIG. 24, the outer leash band 424 can include apertures 418 where a magnet can be attached or embedded inside the leash guide 414. The leash attachment ring 428 can be made from a ferromagnetic material that is magnetically attracted to the magnet in the apertures 418 to help center the leash attachment ring 428 on the outer leash band 424. In other alternative examples, a piece of ferromagnetic material can be attached or embedded inside the apertures 418, and the leash attachment ring 428 can be a magnet that is attracted to the piece of ferromagnetic material in the apertures 418 to help center the leash attachment ring 428.

Figure 25:
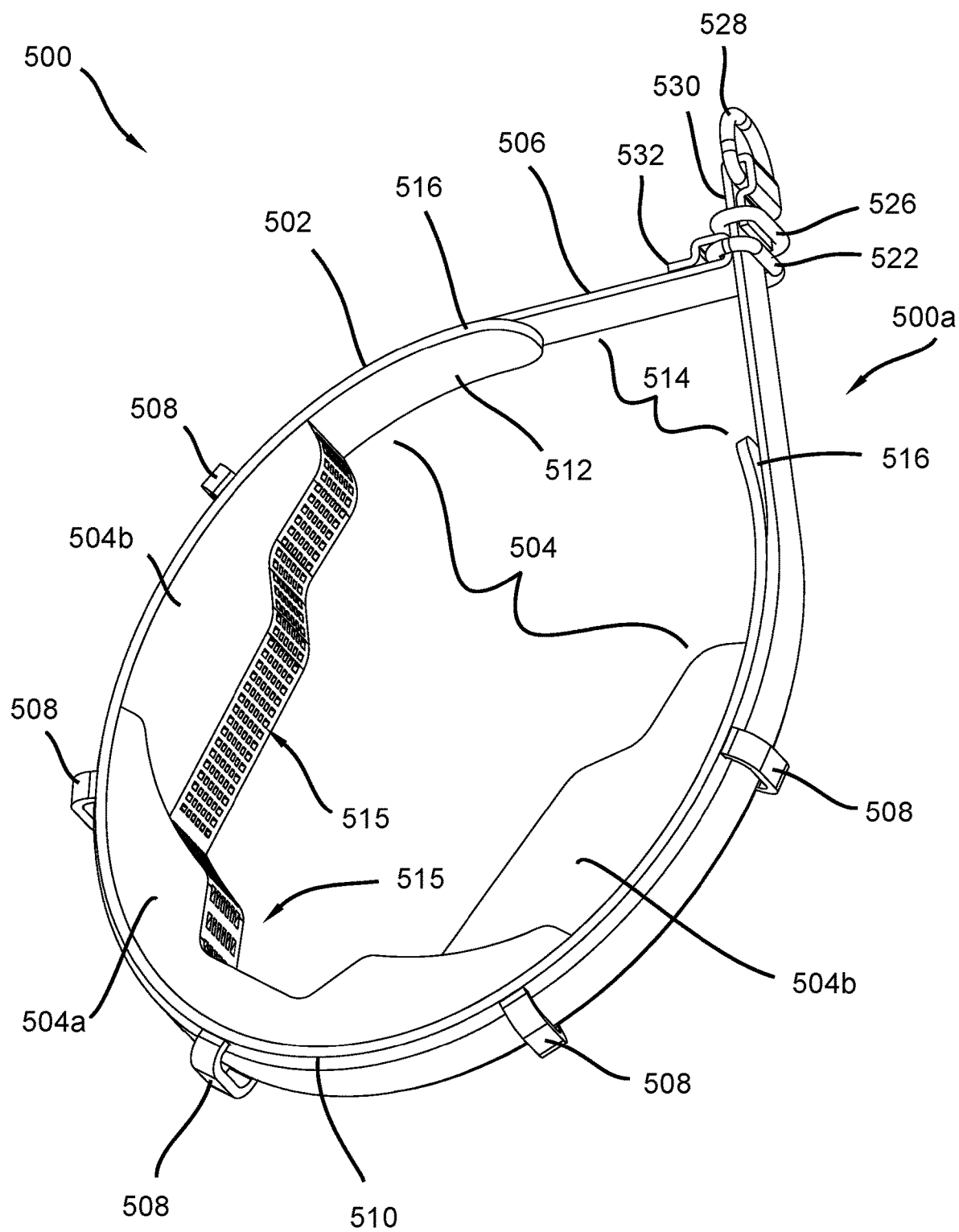
FIG. 25 is an isometric view of an animal restraint in accordance with another embodiment of the present disclosure, the animal restraint shown in a relaxed position.

FIG. 25 is an isometric view of an animal restraint 500 in accordance with another embodiment of the present disclosure. The animal restraint 500 protects the airway and critical anatomical structures of the neck, cervical spine, and vasculature of an animal when the animal pulls on a restraining leash, tether, chain, rope, cable, and the like (herein referred to as a "leash") attached to the animal restraint 500.

The animal restraint 500 provides a custom fit for each animal that wears the animal restraint 500. In some examples, the animal restraint 500 is a choke-less collar adapted to fit a wide range of animal neck sizes and shapes, and to comfortably conform to the size and shape of an animal's neck. Accordingly, fewer sizes are needed which is advantageous for the manufacturability and inventory of the animal restraint 500.

The animal restraint 500 includes a track housing 502, impact resistant padding 504, and a strap 506. In FIG. 25, the animal restraint 500 is shown in a relaxed position 500a. The animal restraint 500 transitions from the relaxed position 500a to an engaged position 500b (see FIGS. 27 and 28) from a pulling force on the animal restraint 500.

The track housing 502 includes a plurality of loops 508 on an exterior surface 510. The loops 508 prevent axial movement of the strap 506 relative to the track housing 502 while allowing radial movement of the strap 506 relative to the track housing 502. Accordingly, the loops 508 secure the strap 506 to the track housing 502 such that the strap 506 is able to slide relative the track housing 502.

In some examples, an auxiliary leash can be attached to one of the loops 508 of the animal restraint 500 to correct inappropriate pulling during loose leash walking training. The incorrect movement of the animal can be corrected by gently pulling the auxiliary leash sideways to change the direction of the animal as it travels.

In the examples illustrated in the figures, five loops 508 are included on the exterior surface 510 of the track housing 502. It is contemplated that the number of loops 508 may vary as needed such that the track housing can include fewer than five loops or more than five loops. Additionally, the number of loops may increase or decrease according to the size of the animal restraint 500 (e.g., a larger sized animal restraint adapted for fitting around the necks of larger animals may include more loops than a smaller sized animal restraint adapted for fitting around the necks of smaller animals). Accordingly, the track housing 502 is not limited to a particular number of loops.

The strap 506 is made from a standard leash material. In some illustrative examples, the strap 506 is made from a woven or braided polyester material, or leather. As will be described in more detail below, the strap 506 is adapted to slide around the exterior surface 510 of the track housing 502. Advantageously, the sliding movement around the exterior surface 510 helps to maintain a proper anterior-posterior positioning of the animal restraint 500 by maintaining a proper positioning of the impact resistant padding 504 over corresponding anatomical structures of the neck of an animal.

The strap 506 includes a leash attachment ring 528 that is attached to a first end 530 of the strap 506. The leash attachment ring 528 is removably attachable to a leash. The strap 506 further includes a slip-ring 522 attached to an opposite, second end 532 of the strap 506. Prior to attaching the leash attachment ring 528 to the first end 530 of the strap 506, the first end 530 of the strap 506 is threaded through the loops 508 on the exterior surface 510 of the track housing, and thereafter through the slip-ring 522 such that the strap 506 wraps around the exterior surface 510 of the track housing 502.

The slip-ring 522 tightens the strap 506 around the track housing 502 when a pulling force is applied onto the animal restraint 500 (i.e., when an animal pulls on a leash attached to the leash attachment ring 528 of the strap 506). The tightening of the strap 506 around the track housing 502 causes the animal restraint 500 to transition from the relaxed position 500a (see FIG. 25) to the engaged position 500b (see FIG. 27) which reduces the circumference of the track housing 502 around the animal's neck.

Figure 28:
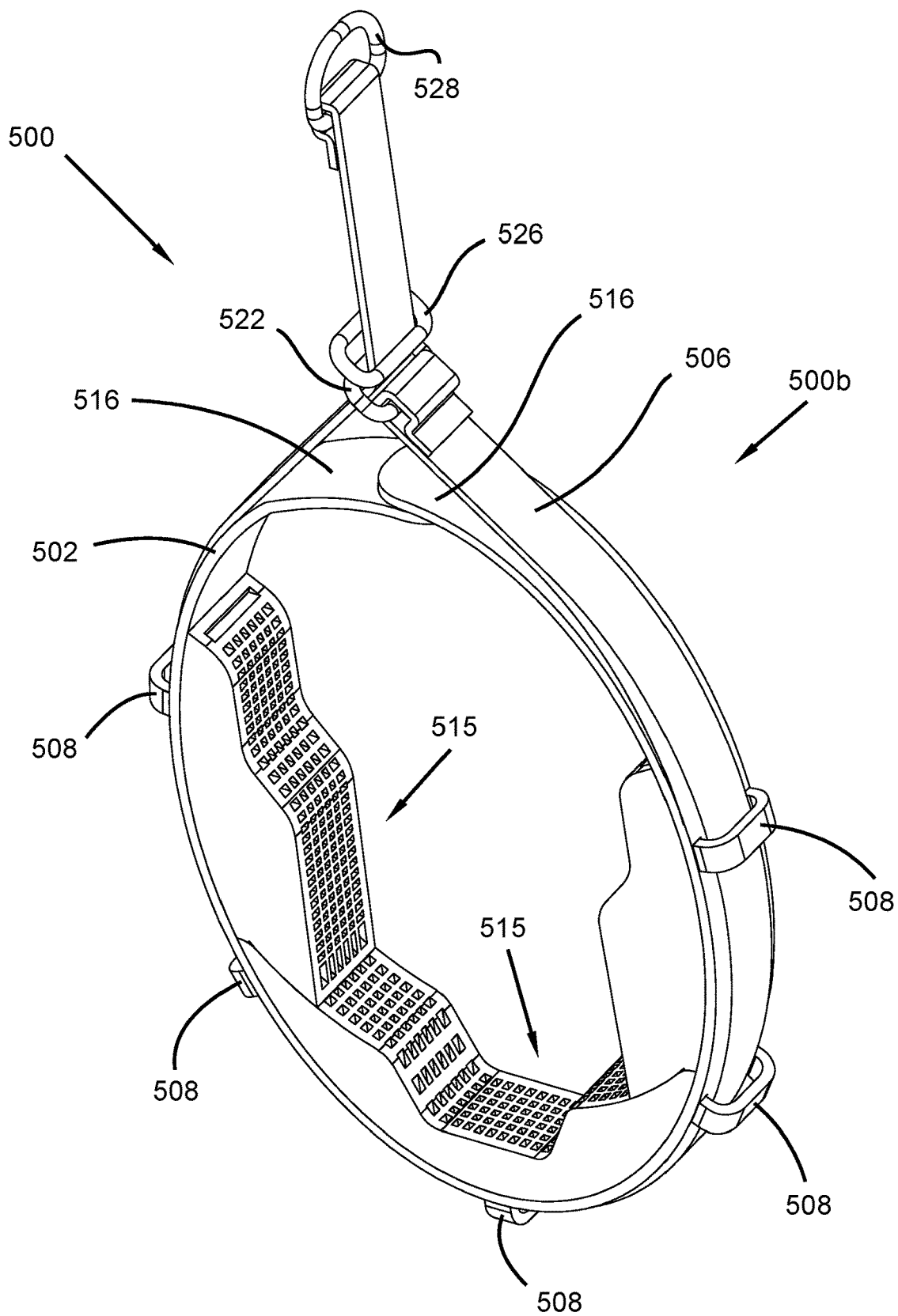
FIG. 28 is another isometric view of the animal restraint in the engaged position.
Figure 29:
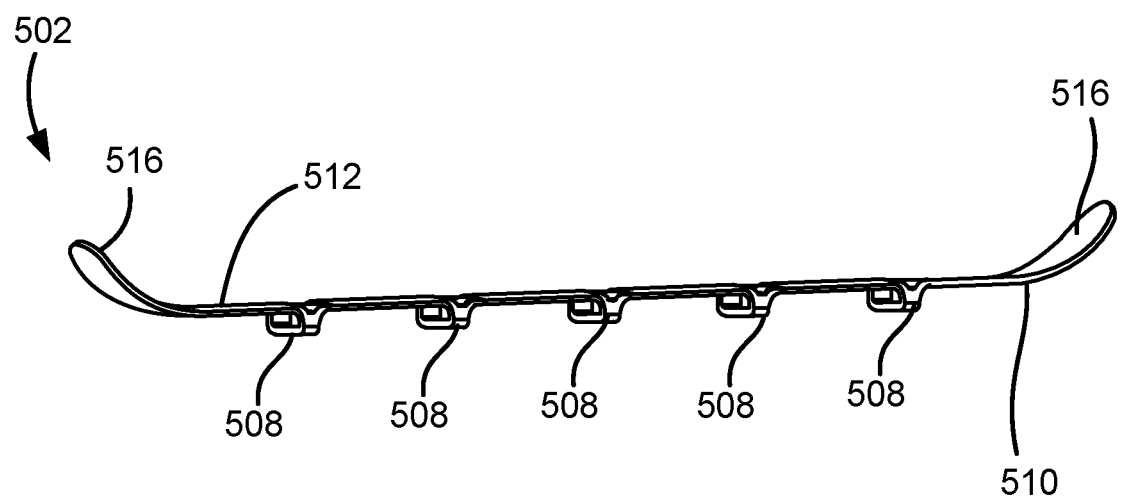
FIG. 29 is an isometric view of a track housing of the animal restraint of FIG. 25.

FIG. 29 is an isometric view of the track housing 502 without the strap 506 attached thereto. Referring now to FIGS. 25 and 29, the track housing 502 is a molded piece of material that bends from the tightening of the strap 506 around the exterior surface 510 of the track housing 502. The bending of the track housing 502 allows the animal restraint 500 to transition from the relaxed position 500a to the engaged position 500b by reducing a gap 514 between distal ends 516 of the track housing 502 (see FIG. 25). In some examples, the distal ends 516 of the track housing 502 overlap one another (see FIGS. 27 and 28) when the animal restraint 500 is in the engaged position 500b.

As shown in FIG. 29, the track housing 502 is molded to have the distal ends 516 curve outwardly to enhance the ability of the track housing to flex inwardly from the tightening of the strap 506 around the exterior surface 510 of the track housing 502.

The bendable design of the track housing 502 overcomes manufacturability challenges by reducing the complexity of molds used for manufacturing the track housing 502 including eliminating the need for complex, multistage molding techniques. Advantageously, the track housing 502 can be molded with a flat, simple mold design which can decrease the cost of manufacturing the animal restraint 500.

The track housing 502 is adapted to flex outwardly (i.e., to expand the gap 514) when the animal restraint 500 is in the relaxed position 500a. In some examples, the strap 506 includes one or more elements to prevent the gap 514 between distal ends 516 of the track housing 502 from expanding beyond a predetermined distance.

In some examples, a ring element 526 is attached to the strap 506 between the slip-ring 522 and the leash attachment ring 528. The ring element 526 prevents the slip-ring 522 from sliding past the ring element 526 on the strap 506 to prevent the gap 514 from expanding beyond a predetermined distance.

Alternative elements can be utilized to prevent the overexpansion of the gap 514 when the animal restraint 500 is in the relaxed position 500a. For example, a rivet can be attached between the slip-ring 522 and the leash attachment ring 528 to prevent the gap 514 from expanding beyond a predetermined distance.

Figure 26:
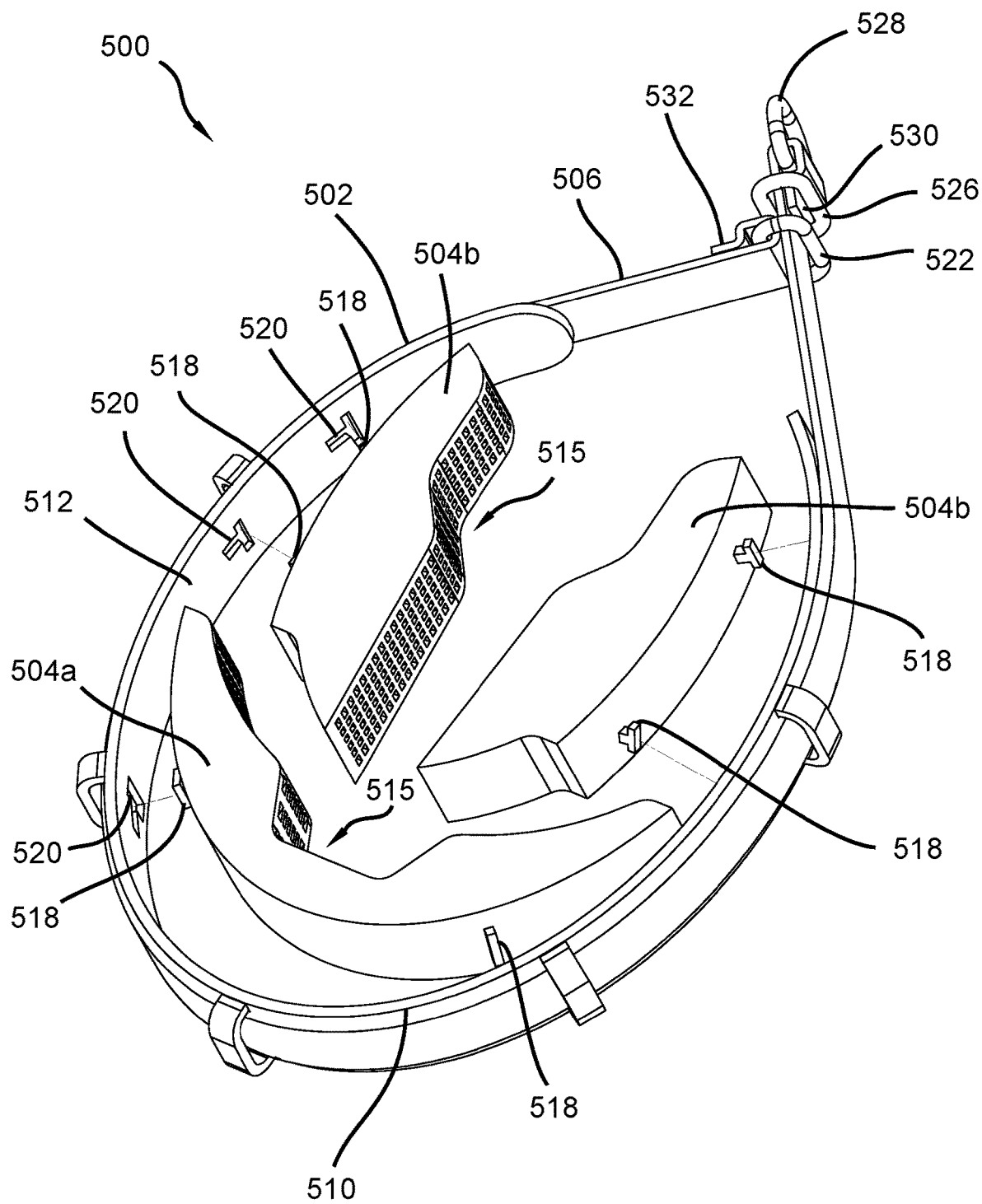
FIG. 26 is a partially exploded isometric view of the animal restraint of FIG. 25.

FIG. 26 is a partially exploded isometric view of the animal restraint 500. Referring now to FIGS. 25 and 26, the impact resistant padding 504 attaches to an interior surface 512 of the track housing 502. In the examples illustrated in the figures, the impact resistant padding 504 includes separate pieces of padding that each attach to the interior surface 512 of the track housing 502. In these examples, the impact resistant padding 504 includes a tracheal piece 504a that attaches to a central portion of the interior surface 512 of the track housing 502, and a pair of thyroid pieces 504b that attach to the interior surface 512 on opposite sides of the tracheal piece 504a. The tracheal piece 504a of the impact resistant padding 504 is adapted to engage the trachea of an animal, and the thyroid pieces 504b are adapted to engage the thyroids of the animal.

In alternative examples, the tracheal piece 504a and thyroid pieces 504b are integrated together into a single piece of impact resistant padding such that the impact resistant padding 504 is a single piece of material that attaches to the interior surface 512. In further alternative examples, the impact resistant padding 504 can include more than or fewer than the three separate pieces of padding depicted in the drawings.

Referring now to FIG. 26, the tracheal piece 504a and thyroid pieces 504b each include fasteners 518 for mechanically attaching these pieces of the impact resistant padding 504 to the track housing 502. In the illustrative example depicted in FIG. 26, the fasteners 518 snap-fit into corresponding holes 520 on the interior surface 512 of the track housing 502. Advantageously, the fasteners 518 enable easy replacement of the tracheal piece 504a and thyroid pieces 504b such as when it is desirable to replace worn impact resistant padding 504 with new padding, or when it is desirable to adjust the thickness of the impact resistant padding 504 to more comfortably accommodate the neck size and shape of a particular animal.

Alternative types of fasteners may also be used to mechanically attach the impact resistant padding 504 to the track housing 502 such as, for example, grommets, retaining pins, attachment clips, and the like. One example of another type of mechanical attachment between the track housing 502 and the impact resistant padding 504 is described in more detail below with reference to FIG. 33.

In some further alternative examples, in addition to or as an alternative to the fasteners 518, chemical bonding is used to secure the tracheal piece 504a and thyroid pieces 504b to the interior surface 512 of the track housing 502. In some further examples, the tracheal piece 504a and thyroid pieces 504b are secured to the interior surface 512 of the track housing 502 with glue.

The impact resistant padding 504 is made from a compressible material. In some examples, the impact resistant padding 504 is made from a material having an internal grid pattern 515 that defines a plurality of empty cells. The internal grid pattern 515 provides column buckling to disperse the pulling force on the animal restraint 500. In some examples, the compressible material is an elastic polymer that is molded to have the internal grid pattern 515. Additional types of compressible materials may be used for the impact resistant padding 504 including foam or gel materials.

In some examples, the compressibility of the impact resistant padding 504 varies between the tracheal piece 504a and thyroid pieces 504b. In some examples, the tracheal piece 504a is less compressible than the thyroid pieces 504b to prevent the trachea of the animal from bottoming out against the track housing 502.

In some further examples, the density of the internal grid pattern 515 varies between the tracheal piece 504a and thyroid pieces 504b. In some examples, the internal grid pattern 515 of the tracheal piece 504a has a larger density than the internal grid pattern 515 of the thyroid pieces 504b to prevent the trachea of the animal from bottoming out against the track housing 502.

Additionally, the impact resistant padding 504 is shaped to increase tracheal protection and minimize choking by providing additional surface area for contact with the lateral neck tissue of the animal. The shape of the impact resistant padding 504 decreases the likelihood of tracheal compression and prevents the trachea from bottoming out against the track housing 502 when a pulling force is applied onto the animal restraint.

Figure 27:
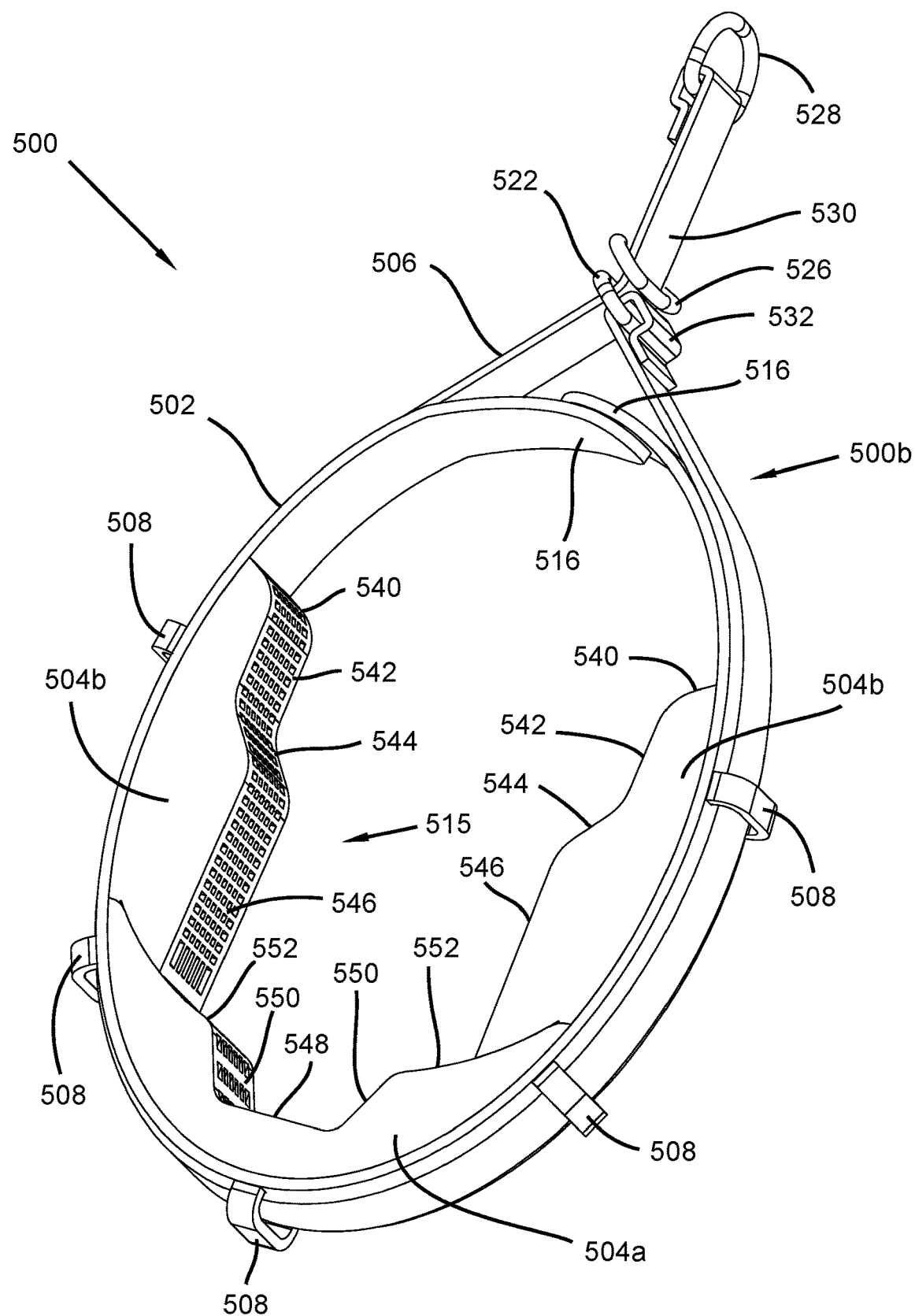
FIG. 27 is an isometric view of the animal restraint of FIG. 25, the animal restraint shown in an engaged position.

Referring now to FIG. 27, the thyroid pieces 504b each have a contoured shape that includes at least a first angled surface 540, followed by a first flat surface 542, a second angled surface 544, and a second flat surface 546. In some examples, the second flat surface 546 is longer than the first flat surface 542 to provide additional surface area for contact with the lateral neck tissue of the animal.

The tracheal piece 504a includes a concave shape that includes at least a flat central surface 548, first angled surfaces 550 that extend from opposite sides of the flat central surface 548, and second angled surfaces 552 that extend from each of the first angled surfaces 550. In some examples, the first angled surfaces 550 are more steeply inclined than the second angled surfaces 552 to prevent the trachea of the animal from bottoming out against the track housing 502.

As an illustrative use example, the animal restraint 500 remains in the relaxed position 500a during loose-leash walking. When the animal pulls on the leash, the animal restraint 500 transitions from the relaxed position 500a to the engaged position 500b, such that the circumference of the track housing 502 tightens around the neck of the animal, and the impact resistant padding 504 compresses against the anatomical neck structures of the animal. Advantageously, the column buckling from the internal grid pattern of the impact resistant padding 504 enables the impact resistant padding 504 to conform around the animal's neck, which enables the animal restraint 500 to provide a consistent degree of comfort for the animal regardless of the amount of force applied by the animal when pulling on the leash attached to the animal restraint 500.

Figure 30:
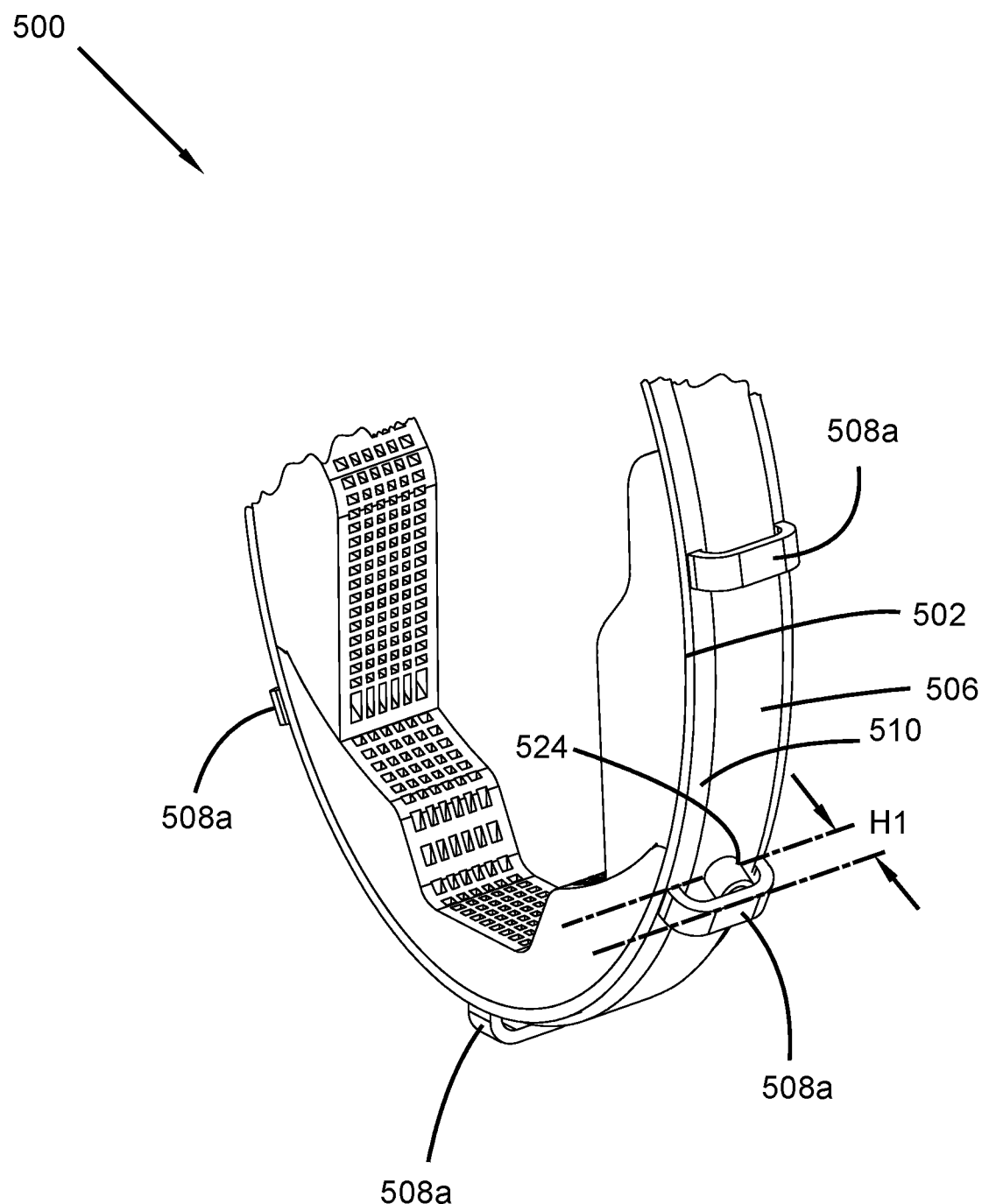
FIG. 30 is an isometric view of the animal restraint of FIG. 25 showing a stop rivet adjacent to an intermediate loop.
Figure 31:
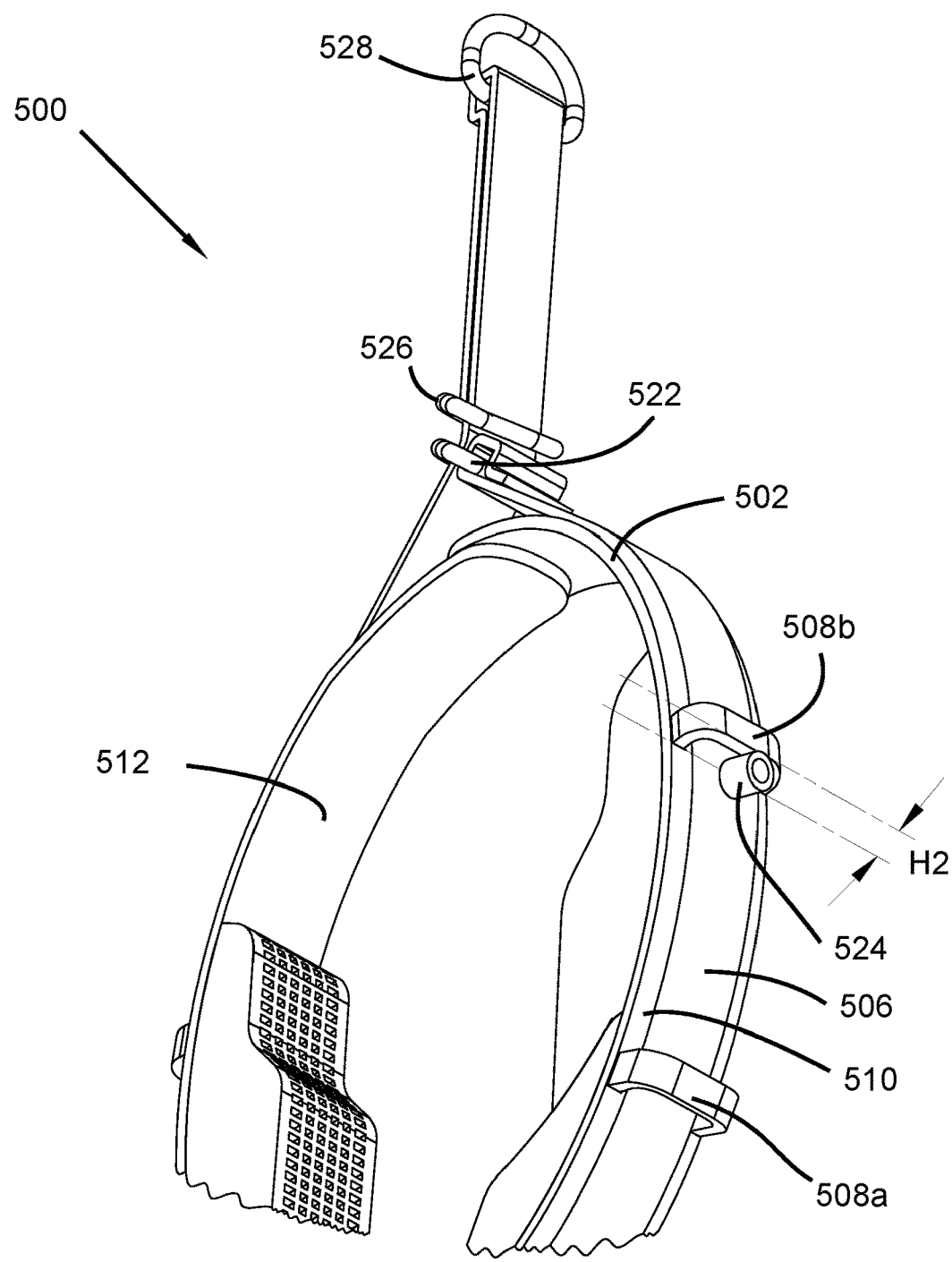
FIG. 31 is a detailed isometric view of the animal restraint of FIG. 25 showing a stop rivet adjacent to a terminal loop.

FIGS. 30 and 31 are isometric views of the animal restraint 500 each showing a stop rivet 524 fixed to the strap 506. At least one stop rivet 524 is attached to the strap 506 according to the neck circumference of the animal.

As described above, the track housing 502 includes a plurality of loops 508 on the exterior surface 510. The plurality of loops 508 includes at least one terminal loop 508b located at an end of the plurality of loops 508 and at least one intermediate loop 508a positioned before the terminal loop 508b in the plurality of loops 508. In FIG. 30, the stop rivet 524 is shown adjacent to an intermediate loop 508a. In FIG. 31, the stop rivet 524 is shown adjacent to a terminal loop 508b.

The intermediate loop 508a defines an opening with a first height H1 and the terminal loop 508b defines an opening with a second height H2. The first height H1 is taller than the second height H2. The taller height H1 enables the stop rivet 524 to pass through the intermediate loop 508a, whereas the shorter height H2 prevents the stop rivet 524 from passing through the terminal loop 508b.

Accordingly, the stop rivet 524 controls the sliding movement of the strap 506 relative to the track housing 502, and also the tautness of the strap 506. Thus, the stop rivet 524 also controls the minimum circumference of the track housing 502 when in the engaged positioned 500b. The placement of the stop rivet 524 on the strap 506 can be adjusted to control the degree that the strap 506 slides relative to the track housing 502. In some examples, the stop rivet 524 limits the strap 506 from sliding relative to the track housing 502 in a range of about 120 to about 180 degrees.

Different sizes for the animal restraint 500 are contemplated for safely and comfortably accommodating a wide variety of animal neck sizes and shapes. As an illustrative example, an extra small size for the animal restraint 500 may fit a 5-9 inch animal neck circumference, a small size for the animal restraint 500 may fit a 10-14 inch animal neck circumference, a medium size for the animal restraint 500 may fit a 15-20 inch animal neck circumference, a large size for the animal restraint 500 may fit a 21-24 inch animal neck circumference, and an extra-large size for the animal restraint 500 may fit a 25-29 inch animal neck circumference. The various sizes enable the animal restraint 500 to provide a proper fit and protection for a wide variety of animal sizes.

Advantageously, the animal restraint 500 is easy to use. For example, the animal restraint 500 can be simply placed over the head and then around the neck of an animal. When properly sized (e.g., neck circumference and stop rivet location), no additional adjustments or positioning is required for the animal restraint 500.

The animal restraint 500 provides comfort with no desensitization training necessary. The animal restraint 500 provides the feel of a standard collar, while the conformational shape and/or memory of the track housing 502 (manufactured flat with slightly curved ends) allows for a loose fit when loose-leash walking.

Additionally, the animal restraint 500 reduces leash entanglement between the legs of the walking animal. Leash entanglement is reduced by the stationary orientation of the leash attachment ring 528 relative to the posterolateral position of the animal's neck which reduces the downward hanging or drooping of the leash during walking.

A further advantage of the animal restraint 500 is an increased level of protection from neck trauma. The impact resistant padding 504 contacts a larger surface area of an animal's neck such that the impact resistant padding 504 improves impact resistance by dampening or distributing shock along a larger surface area. Additionally, the impact resistance is increased at the trachea by the concave shape of the tracheal piece 504a while the contoured shape of thyroid pieces 504b support the lateral neck tissue.

Another advantage of the animal restraint 500 is that the shape of the impact resistant padding 504 allows one size of the animal restraint 500 to fit a wide range of animal neck circumference sizes such as, for example, a three to five inch range of animal neck circumference size while maintaining full functionality.

Figure 32:
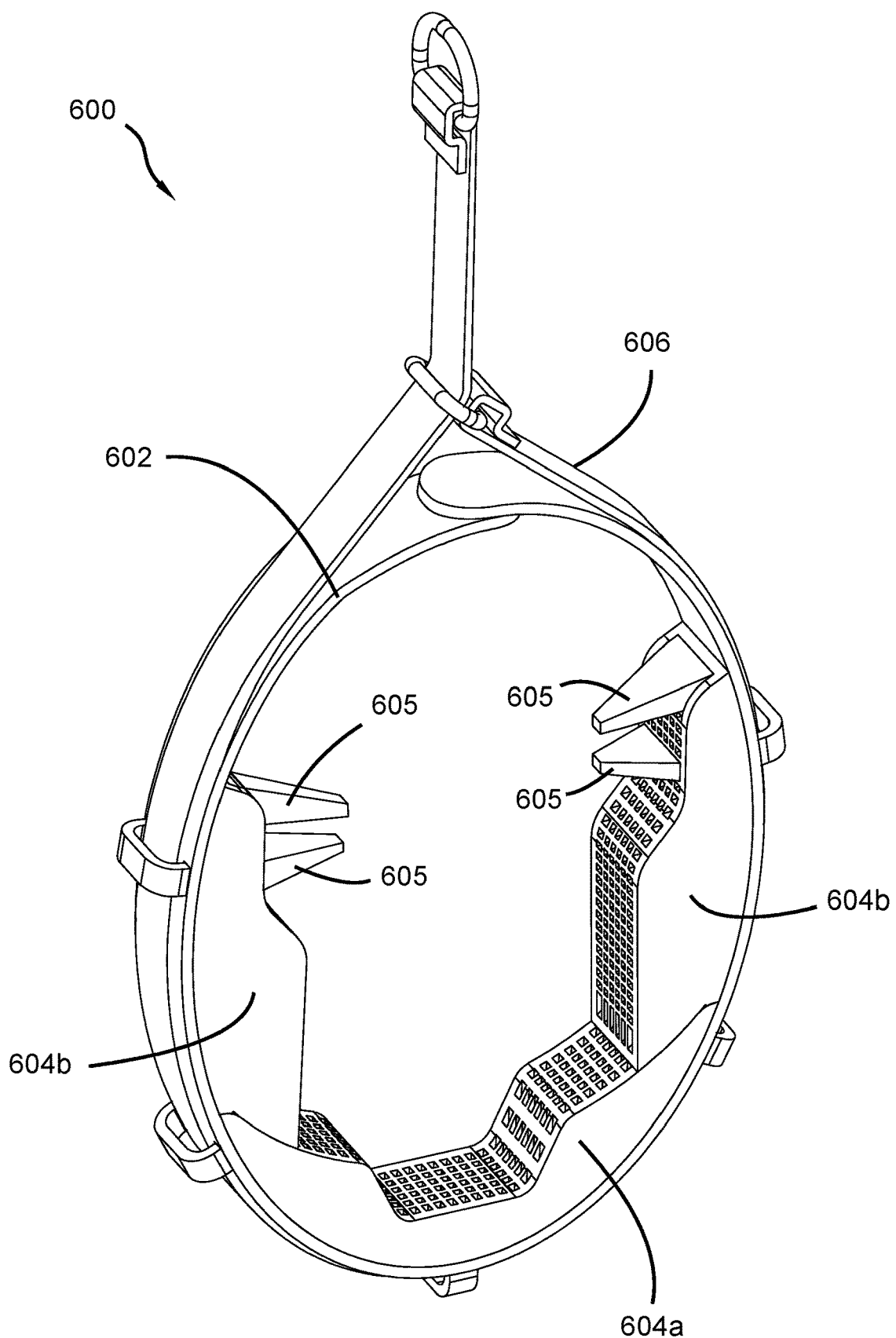
FIG. 32 is an isometric view of an animal restraint in accordance with another embodiment of the present disclosure.

FIG. 32 is an isometric view of an animal restraint 600 in accordance with another embodiment of the present disclosure. The animal restraint 600 shares many features and advantages with the animal restraint 500 described above with reference to FIGS. 25-31. The animal restraint 600 includes a track housing 602, impact resistant padding 604, and a strap 606. The impact resistant padding 604 includes a tracheal piece 604a that attaches to an interior surface of the track housing 602, and thyroid pieces 604b that attach to the interior surface on opposite sides of the tracheal piece 604a.

The animal restraint 600 differs from the animal restraint 500 by including prongs 605 attached toward the ends of the thyroid pieces 604b. The prongs 605 are design to mimic the lateral and posterior neck nipping of a mother dog during puppy rearing. The mimicked neck nipping by the prongs 605 provides a corrective measure to train puppies such that the prongs 605 can be used for training undesirable leash pulling. Accordingly, the prongs 605 provide a sensation that acts as a behavior modification. In some examples, the prongs 605 are designed to have a blunt shape. In some further examples, the prongs 605 are made from a plastic material.

Figure 33:
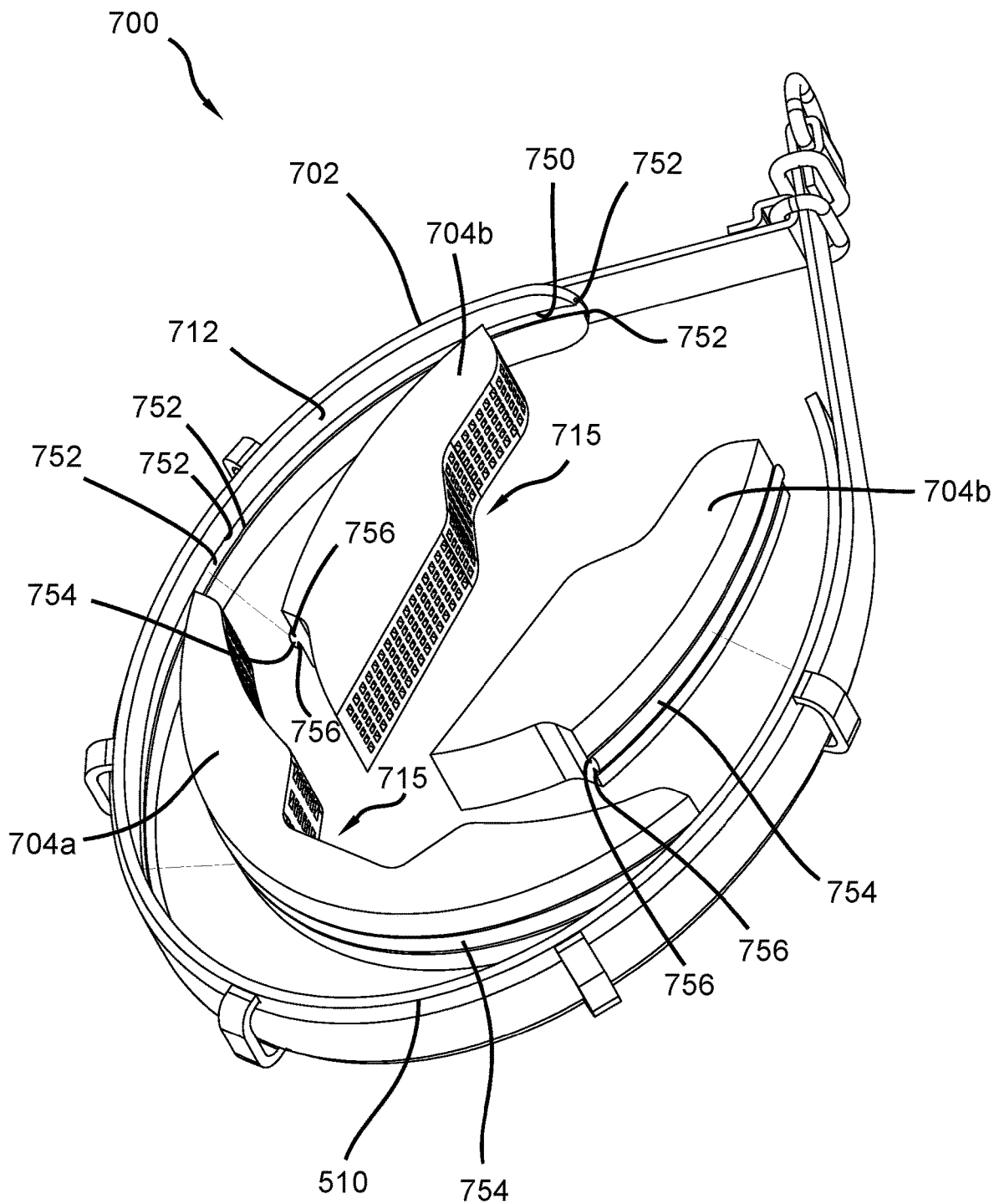
FIG. 33 is an isometric view of an animal restraint in accordance with another embodiment of the present disclosure.

FIG. 33 is an isometric view of an animal restraint 700 showing a mechanical attachment between a track housing 702 and an impact resistant padding 704. The interior surface 712 of the track housing 702 has a groove 750 with opposing lips 752. The impact resistant padding 704 includes a track 754 that having opposing edges 756. The track 754 is insertable into the groove 750 to retain the opposing edges 756 by the lips 752 in the groove 750. The opposing edges 756 are slidable along the length of the groove 750 such that the impact resistant padding 704 can be slotted into the groove 750 to mechanically attach the impact resistant padding 704 to the track housing 702.

The various animal restraints described above minimize collar and leash trauma to critical neck structures of an animal. These animal restraints can minimize or prevent medical conditions such as tracheal trauma/collapse, thyroid gland trauma/disorder, intracranial/intraocular pressure (which can result in glaucoma, and/or other types of cerebral vascular disorders), cervical spine trauma/neuropathy (which can cause cervical spine cord damage leading to neuropathy, weakness, paralysis etc.), and cervical vertebrae trauma that can lead to radiculopathy, and/or neuropathic pain/inflammation (which can be manifested by paw licking and/or muscle weakness).

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed:

1. An animal restraint for mitigating collar trauma to critical neck structures of an animal, the animal restraint comprising:
   a track housing defining an exterior surface and an interior surface;
   a plurality of loops positioned on the exterior surface of the track housing;
   a strap threaded through the loops, the strap adapted to slide around the exterior surface of the track housing from a pulling force on the animal restraint, the strap including a leash attachment ring adapted for attachment to a leash; and
   impact resistant padding attached to the interior surface of the track housing, the sliding movement of the strap maintaining a proper positioning of the impact resistant padding over corresponding anatomical neck structures of an animal.

2. The animal restraint of claim 1, wherein the strap further includes a slip-ring adapted to tighten the strap around the track housing from the pulling force.

3. The animal restraint of claim 1, wherein the pulling force causes the animal restraint to transition from a relaxed position to an engaged position, the engaged position reducing the circumference of the track housing around the neck of the animal.

4. The animal restraint of claim 1, wherein distal ends of the track housing overlap one another when the animal restraint is in the engaged position.

5. The animal restraint of claim 1, wherein the impact resistant padding includes snap fasteners mechanically attaching the impact resistant padding to the interior surface.

6. The animal restraint of claim 1, wherein the impact resistant padding is made from a material having an internal grid pattern that defines a plurality of empty cells, the internal grid pattern providing column buckling to disperse the pulling force.

7. The animal restraint of claim 6, wherein the impact resistant padding is an elastic polymer that is molded to have the internal grid pattern.

8. The animal restraint of claim 1, wherein the impact resistant padding includes a tracheal piece that attaches to a central portion of the interior surface, and thyroid pieces that attach to the interior surface on opposite sides of the tracheal piece.

9. The animal restraint of claim 1, wherein one or more stop rivets are fixed to the strap to control the sliding movement of the strap relative to the track housing.

10. The animal restraint of claim 9, wherein the one or more stop rivets limit the strap from sliding relative to the track housing in a range of about 120 to about 180 degrees.

11. The animal restraint of claim 9, wherein the plurality of loops includes an intermediate loop and a terminal loop, the intermediate loop defining an opening with a first height, the terminal loop defining an opening with a second height, the first height enabling the one or more stop rivets to pass through the intermediate loop, and the second height preventing the one or more stop rivets from passing through the terminal loop.

12. The animal restraint of claim 1, wherein the track housing is adapted to flex outwardly when the animal restraint is in a relaxed position, the outward flex expanding a gap between distal ends of the track housing.

13. The animal restraint of claim 1, further comprising an element attached to the strap between a slip-ring and the leash attachment ring, the element preventing the slip-ring from sliding past the element on the strap to prevent the gap between the distal ends of the track housing from expanding beyond a predetermined distance.

14. The animal restraint of claim 1, further comprising prongs attached to the internal surface of the track housing adjacent to the impact resistant padding.

* * * * *

UNITED STATES PATENT AND TRADEMARK OFFICE
CERTIFICATE OF CORRECTION

PATENT NO. : 11,246,295 B2
APPLICATION NO. : 16/576975
DATED : February 15, 2022
INVENTOR(S) : Lennie D. Robinson Page 1 of 1

It is certified that error appears in the above-identified patent and that said Letters Patent is hereby corrected as shown below:

On the Title Page

Column 2, Line 2 under Other Publications, should read:
--com.hk/products/tru-fit-smart-harness-size-small. Accessed Apr. 17,--

Signed and Sealed this
Twenty-eighth Day of November, 2023

Katherine Kelly Vidal

Katherine Kelly Vidal
*Director of the United States Patent and Trademark Office*